(12) United States Patent
Metwaly Saad et al.

(10) Patent No.: US 12,261,899 B2
(45) Date of Patent: Mar. 25, 2025

(54) TECHNIQUES FOR MULTIMEDIA UPLINK PACKET HANDLING

(71) Applicant: QUALCOMM Incorporated, San Diego, CA (US)

(72) Inventors: Hussein Metwaly Saad, San Diego, CA (US); Ravi Agarwal, San Diego, CA (US); Peerapol Tinnakornsrisuphap, San Diego, CA (US); Mickael Mondet, Louannec (FR); Hyun Yong Lee, San Diego, CA (US); Chih-Ping Li, San Diego, CA (US); Prashanth Haridas Hande, San Diego, CA (US); Arvind Vardarajan Santhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 17/693,123

(22) Filed: Mar. 11, 2022

(65) Prior Publication Data

US 2023/0291781 A1 Sep. 14, 2023

(51) Int. Cl.
*H04W 72/1268* (2023.01)
*H04L 65/10* (2022.01)
(Continued)

(52) U.S. Cl.
CPC .......... *H04L 65/80* (2013.01); *H04L 65/1013* (2013.01); *H04W 72/1268* (2013.01); *H04W 72/542* (2023.01); *H04W 80/08* (2013.01)

(58) Field of Classification Search
CPC . H04L 65/80; H04L 65/1013; H04L 65/1069; H04W 72/1268; H04W 72/542; H04W 80/08; H04W 28/0268
See application file for complete search history.

(56) References Cited

U.S. PATENT DOCUMENTS 7,289,832 B1 * 10/2007 Enoki .................. H04W 60/02
455/343.1
8,339,950 B2 * 12/2012 Yoo ..................... H04L 49/9078
370/230.1
(Continued)

FOREIGN PATENT DOCUMENTS

WO WO-2007113645 A2 * 10/2007 ............. H04L 1/205
WO WO-2017026686 A1 2/2017
(Continued)

OTHER PUBLICATIONS

International Search Report and Written Opinion—PCT/US2023/063496—ISA/EPO—May 9, 2023.

*Primary Examiner* — Oanh Duong
(74) *Attorney, Agent, or Firm* — Holland & Hart LLP

(57) ABSTRACT

Methods, systems, and devices for wireless communications are described. The method may include a user equipment (UE) generating a set of multimedia packets including a first multimedia packet and a second multimedia packet that is generated after the first multimedia packet. The UE may add the set of multimedia packets to a queue and apply an uplink packet handling protocol. Using the uplink packet handling protocol, the UE may discard the first multimedia packet and transmit, to a base station, the second multimedia packet. Using the second multimedia packet, a server in communication with the base station may generate a video frame and transmit the video frame to the UE via the base station.

30 Claims, 23 Drawing Sheets

(51) Int. Cl.
*H04L 65/80* (2022.01)
*H04W 72/542* (2023.01)
*H04W 80/08* (2009.01)

(56) References Cited

U.S. PATENT DOCUMENTS

| | | |
|---|---|---|
| 10,320,705 B1* | 6/2019 | Li ................. H04L 47/2441 |
| 2016/0173385 A1* | 6/2016 | Isaksson ............ H04L 47/283 |
| | | 370/238 |
| 2017/0111415 A1* | 4/2017 | Bao .............. H04N 21/44004 |
| 2021/0392090 A1* | 12/2021 | Laselva ................. H04L 1/08 |
| 2021/0400709 A1 | 12/2021 | Namjoshi et al. |

FOREIGN PATENT DOCUMENTS

| | | |
|---|---|---|
| WO | WO-2017196380 A1 | 11/2017 |
| WO | WO-2018175855 A1 | 9/2018 |

* cited by examiner

TECHNIQUES FOR MULTIMEDIA UPLINK PACKET HANDLING

FIELD OF TECHNOLOGY

The present disclosure relates to wireless communications, including techniques for multimedia uplink packet handling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a wireless communications system may support remote gaming. To support remote gaming, a UE may transmit multimedia information (e.g., pose information or controller information) to a remote server. The remote server may render a video frame based on the multimedia information and transmit the video frame to the UE. In some examples, the UE may not obtain enough uplink grants to transmit the multimedia information at a desired rate. In such case, the UE may add the packets including the multimedia information to a queue and transmit the packets in the queue as grants are obtained.

SUMMARY

The described techniques relate to improved methods, systems, devices, and apparatuses that support techniques for multimedia uplink packet handling. Generally, the described techniques provide for a user equipment (UE) to implement an uplink packet handling protocol for packets including multimedia information. The uplink packet handling protocol may instruct the UE to discard a packet in a queue and transmit a different packet in the queue that was added to the queue after the discarded packet. In one example, the UE may generate a set of packets in the following order: a first uplink packet, a second uplink packet, and a third uplink packet and add the set of packets to the queue according to the same order. Using the uplink packet handling protocol, the UE may discard the first uplink packet and one or both of the second uplink packet or the third uplink packet to a remote server. The methods as described herein may allow the UE to transmit the latest multimedia information to the remote server first which may allow the server to generate video frames based on the most recent multimedia information.

A method for wireless communication at a UE is described. The method may include generating a set of multiple uplink packets including multimedia information, the set of multiple uplink packets including at least a first set of uplink packets and a second set of uplink packets, where the first set of uplink packets includes a first uplink packet and a second uplink packet, and where the first uplink packet is generated before the second uplink packet, adding the set of multiple uplink packets to a queue according to an order in which the set of multiple uplink packets are generated, applying an uplink packet handling protocol to the first set of uplink packets, discarding the first uplink packet based on the uplink packet handling protocol, transmitting, to a network node, the second uplink packet including the multimedia information based on the uplink packet handling protocol, and receiving, from the network node, a video frame in response to transmitting the second uplink packet.

An apparatus for wireless communication at a UE is described. The apparatus may include a processor, memory coupled with the processor, and instructions stored in the memory. The instructions may be executable by the processor to cause the apparatus to generate a set of multiple uplink packets including multimedia information, the set of multiple uplink packets including at least a first set of uplink packets and a second set of uplink packets, where the first set of uplink packets includes a first uplink packet and a second uplink packet, and where the first uplink packet is generated before the second uplink packet, add the set of multiple uplink packets to a queue according to an order in which the set of multiple uplink packets are generated, apply an uplink packet handling protocol to the first set of uplink packets, discard the first uplink packet based on the uplink packet handling protocol, transmit, to a network node, the second uplink packet including the multimedia information based on the uplink packet handling protocol, and receive, from the network node, a video frame in response to transmitting the second uplink packet.

Another apparatus for wireless communication at a UE is described. The apparatus may include means for generating a set of multiple uplink packets including multimedia information, the set of multiple uplink packets including at least a first set of uplink packets and a second set of uplink packets, where the first set of uplink packets includes a first uplink packet and a second uplink packet, and where the first uplink packet is generated before the second uplink packet, means for adding the set of multiple uplink packets to a queue according to an order in which the set of multiple uplink packets are generated, means for applying an uplink packet handling protocol to the first set of uplink packets, means for discarding the first uplink packet based on the uplink packet handling protocol, means for transmitting, to a network node, the second uplink packet including the multimedia information based on the uplink packet handling protocol, and means for receiving, from the network node, a video frame in response to transmitting the second uplink packet.

A non-transitory computer-readable medium storing code for wireless communication at a UE is described. The code may include instructions executable by a processor to generate a set of multiple uplink packets including multimedia information, the set of multiple uplink packets including at least a first set of uplink packets and a second set of uplink packets, where the first set of uplink packets includes a first uplink packet and a second uplink packet, and where the first uplink packet is generated before the second uplink packet, add the set of multiple uplink packets to a queue according to an order in which the set of multiple uplink packets are generated, apply an uplink packet handling protocol to the first set of uplink packets, discard the first uplink packet based on the uplink packet handling protocol, transmit, to a network node, the second uplink packet including the multimedia information based on the uplink packet handling protocol, and receive, from the network node, a video frame in response to transmitting the second uplink packet.

In some examples of the method, apparatuses, and non-transitory computer-readable medium described herein, the UE operates in accordance to a communication model and the method, apparatuses, and non-transitory computer-readable medium may include further operations, features, means, or instructions for transmitting signaling indicating the uplink packet handling protocol from the application to the physical layer.

Some examples of the method, apparatuses, and non-transitory computer-readable medium described herein may further include operations, features, means, or instructions for receiving, from the network node, signaling indicating the uplink packet handling protocol.

In some examples of the method, apparatuses, and non-transitory computer-readable medium described herein, the first set of uplink packet includes uplink packets that correspond to one or more of a same source internet protocol (IP) address, destination IP address, user datagram protocol (UDP) port, or differentiated services code point (DSCP) marking.

In some examples of the method, apparatuses, and non-transitory computer-readable medium described herein, the second uplink packet may be a last uplink packet added to the queue.

Some examples of the method, apparatuses, and non-transitory computer-readable medium described herein may further include operations, features, means, or instructions for identifying a threshold quantity of the first set of uplink packets that can be kept in the queue based on the uplink packet handling protocol, where discarding the first uplink packet may be in response to a quantity corresponding to the first set of uplink packets exceeding the threshold quantity of uplink packets.

In some examples of the method, apparatuses, and non-transitory computer-readable medium described herein, the threshold quantity of the first set of uplink packets may be based on a rate of change of the multimedia information.

In some examples of the method, apparatuses, and non-transitory computer-readable medium described herein, the first set of uplink packets further includes a third uplink packet, the third uplink packet generated after the second uplink packet.

Some examples of the method, apparatuses, and non-transitory computer-readable medium described herein may further include operations, features, means, or instructions for bundling the second uplink packet and the third uplink packet based on a link quality of a link between the UE and the network node satisfying a threshold, where transmitting the second uplink packet includes transmitting the bundled uplink packet to the network node.

In some examples of the method, apparatuses, and non-transitory computer-readable medium described herein, the second uplink packet and the third uplink packet may be the last two uplink packets of the first set of uplink packets to be added to the queue.

Some examples of the method, apparatuses, and non-transitory computer-readable medium described herein may further include operations, features, means, or instructions for powering off one or more transceiver components at the UE for a duration, the duration including a time between transmitting the second uplink packet and receiving the video frame or a time between receiving a second video frame and transmitting the second uplink packet, where the second video frame may be received before the video frame.

In some examples of the method, apparatuses, and non-transitory computer-readable medium described herein, the multimedia information includes a location of the UE, an orientation of the UE, a set of user inputs, or a combination thereof.

A method for wireless communications at a network node is described. The method may include transmitting signaling indicating an uplink packet handling protocol to apply to a first set of uplink packets including multimedia information, the first set of uplink packets including a first uplink packet and a second uplink packet, receiving the second uplink packet including the multimedia information according to the uplink packet handling protocol, and transmitting a video frame in response to receiving the second uplink packet.

An apparatus for wireless communications at a network node is described. The apparatus may include a processor, memory coupled with the processor, and instructions stored in the memory. The instructions may be executable by the processor to cause the apparatus to transmit signaling indicating an uplink packet handling protocol to apply to a first set of uplink packets including multimedia information, the first set of uplink packets including a first uplink packet and a second uplink packet, receive the second uplink packet including the multimedia information according to the uplink packet handling protocol, and transmit a video frame in response to receiving the second uplink packet.

Another apparatus for wireless communications at a network node is described. The apparatus may include means for transmitting signaling indicating an uplink packet handling protocol to apply to a first set of uplink packets including multimedia information, the first set of uplink packets including a first uplink packet and a second uplink packet, means for receiving the second uplink packet including the multimedia information according to the uplink packet handling protocol, and means for transmitting a video frame in response to receiving the second uplink packet.

A non-transitory computer-readable medium storing code for wireless communications at a network node is described. The code may include instructions executable by a processor to transmit signaling indicating an uplink packet handling protocol to apply to a first set of uplink packets including multimedia information, the first set of uplink packets including a first uplink packet and a second uplink packet, receive the second uplink packet including the multimedia information according to the uplink packet handling protocol, and transmit a video frame in response to receiving the second uplink packet.

In some examples of the method, apparatuses, and non-transitory computer-readable medium described herein, the first set of uplink packets includes uplink packets that correspond to one or more of a same source IP address, destination IP address, UDP port, or DSCP marking.

Some examples of the method, apparatuses, and non-transitory computer-readable medium described herein may further include operations, features, means, or instructions for transmitting signaling indicating a threshold quantity of uplink packets of the first set of uplink packet that can be kept in a queue.

In some examples of the method, apparatuses, and non-transitory computer-readable medium described herein, the threshold quantity of uplink packets may be based on a rate of change of the multimedia information.

In some examples of the method, apparatuses, and non-transitory computer-readable medium described herein, receiving the second uplink packet may include operations, features, means, or instructions for receiving the second uplink packet bundled with a third uplink packet, where the first set of uplink packets further includes the third uplink packet.

In some examples of the method, apparatuses, and non-transitory computer-readable medium described herein, the multimedia information includes a location of the UE, an orientation of the UE, a set of user inputs, or a combination thereof.

A method for wireless communication at a server is described. The method may include receiving, from a UE via a network node, a set of multiple uplink packets including multimedia information, the set of multiple uplink packet including a first uplink packet and a second uplink packet, estimating future multimedia information associated with the UE based on the first uplink packet and the second uplink packet, generating a video frame based on the estimated future multimedia information, and transmitting, to the UE via the network node, the video frame.

An apparatus for wireless communication at a server is described. The apparatus may include a processor, memory coupled with the processor, and instructions stored in the memory. The instructions may be executable by the processor to cause the apparatus to receive, from a UE via a network node, a set of multiple uplink packets including multimedia information, the set of multiple uplink packet including a first uplink packet and a second uplink packet, estimate future multimedia information associated with the UE based on the first uplink packet and the second uplink packet, generate a video frame based on the estimated future multimedia information, and transmit, to the UE via the network node, the video frame.

Another apparatus for wireless communication at a server is described. The apparatus may include means for receiving, from a UE via a network node, a set of multiple uplink packets including multimedia information, the set of multiple uplink packet including a first uplink packet and a second uplink packet, means for estimating future multimedia information associated with the UE based on the first uplink packet and the second uplink packet, means for generating a video frame based on the estimated future multimedia information, and means for transmitting, to the UE via the network node, the video frame.

A non-transitory computer-readable medium storing code for wireless communication at a server is described. The code may include instructions executable by a processor to receive, from a UE via a network node, a set of multiple uplink packets including multimedia information, the set of multiple uplink packet including a first uplink packet and a second uplink packet, estimate future multimedia information associated with the UE based on the first uplink packet and the second uplink packet, generate a video frame based on the estimated future multimedia information, and transmit, to the UE via the network node, the video frame.

DETAILED DESCRIPTION

In some examples, a wireless communications system may support extended reality (XR) or cloud gaming. In XR or cloud gaming, a UE may transmit multimedia information (e.g., pose information or controller information) to a base station and the base station may relay the multimedia information to a server (e.g., a cloud server). The server may use the multimedia information to render a video frame and transmit the video frame to the UE using the base station as a relay. In some examples, the UE may not have enough uplink grants to transmit packets including the multimedia information to the base station at a desired rate (e.g., one packet every 2 milliseconds). In such case, the UE may queue the packets and transmit the packets according to a first-in-first-out (FIFO) order as the UE receives uplink grants from the base station. That is, the UE may transmit the oldest packet in the queue first (e.g., the packet that was added to the queue first). However, transmitting the oldest packet first may cause the server to render a video frame based on old or stale multimedia information.

In some examples, the UE may transmit multimedia information to the base station according to an uplink packet handling protocol. The uplink packet handling protocol may indicate a set of rules that the UE may follow when transmitting uplink packets including multimedia information to the base station. In one example, the rules may specify for the UE to use a last-in-first-out (LIFO) order when transmitting the uplink packets. Using the LIFO order, the UE may transmit the most recently generated packet (e.g., a packet that is added to the queue last) to the base station first. Additionally or alternatively, the rules may specify for the UE to keep a threshold number of packets in the queue. If a number of packets in the queue exceeds the threshold quantity of packets, the UE may discard the oldest packet (e.g., a packet added to the queue first). Additionally or alternatively, the rules may specify to bundle some of the most recently generated packets (e.g., two or more packets added to the queue last) and transmit the bundled packet to the base station. Using the methods as described herein may allow the server to render video frames using the most recent multimedia information which may increase the accuracy of the video frame rendered by the server.

Aspects of the disclosure are initially described in the context of wireless communications systems. Additional aspects of the disclosure are described in the context of timing diagrams and a process flow. Aspects of the disclosure are further illustrated by and described with reference to apparatus diagrams, system diagrams, and flowcharts that relate to techniques for multimedia uplink packet handling.

Figure 1:
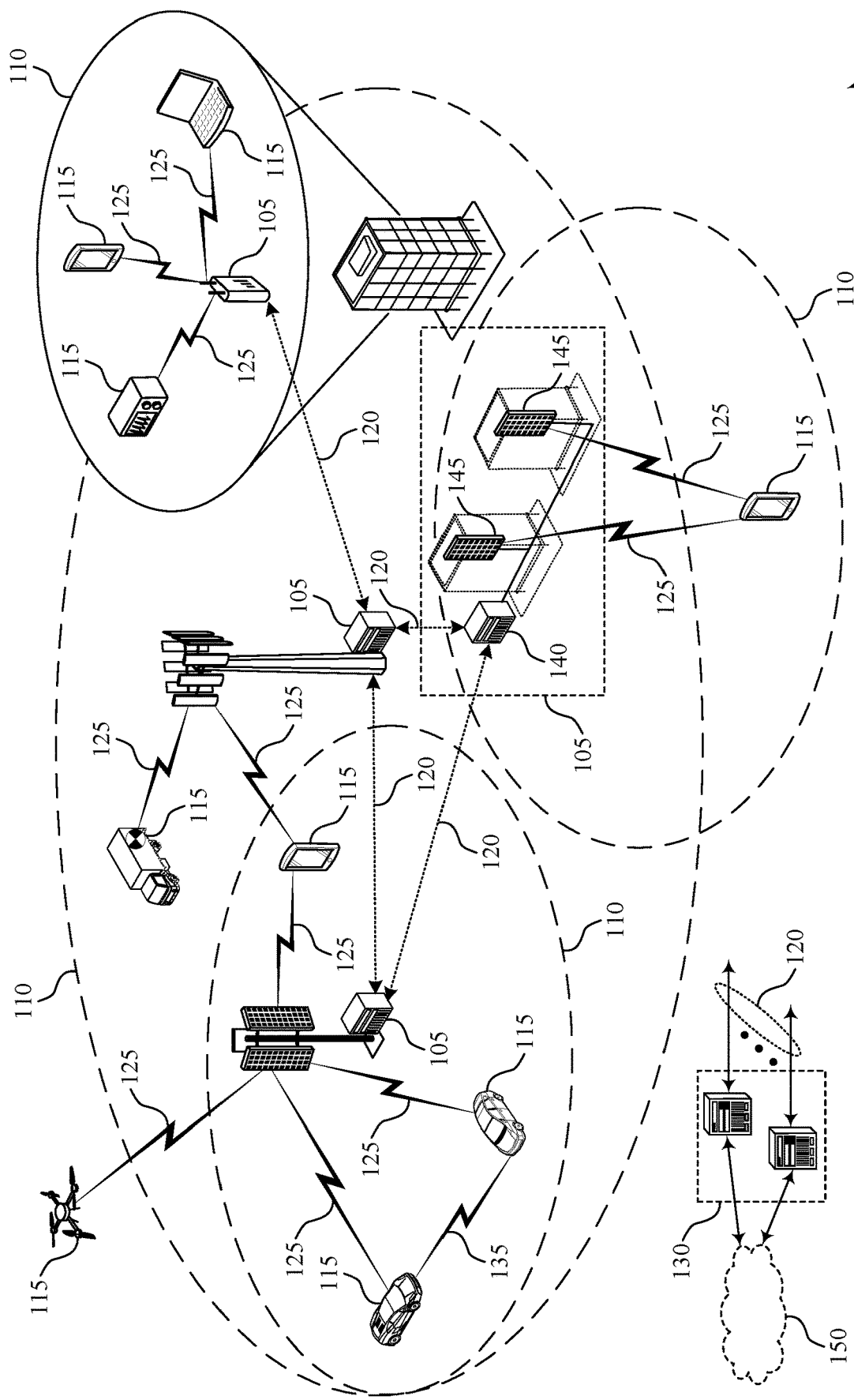
FIGS. 1 and 2 illustrate examples of a wireless communications system that supports techniques for multimedia uplink packet handling in accordance with aspects of the present disclosure.

FIG. 1 illustrates an example of a wireless communications system 100 that supports techniques for multimedia uplink packet handling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

One or more of the network nodes described herein may include or may be referred to as a base station 105 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network node (e.g., a base station 105) may be implemented in an aggregated (e.g., monolithic, standalone) base station architecture, which may be configured to utilize a protocol stack that is physically or logically integrated within a single network node (e.g., a single RAN node, such as a base station 105). Additionally, the network node may be implemented as a integrated access backhaul (IAB) node, a relay node, a sidelink node, etc.

In some examples, a network node may be implemented in a disaggregated architecture (e.g., a disaggregated base station architecture, a disaggregated RAN architecture), which may be configured to utilize a protocol stack that is physically or logically distributed among two or more network nodes, such as an IAB network, an open RAN (O-RAN) (e.g., a network configuration sponsored by the O-RAN Alliance), or a virtualized RAN (vRAN) (e.g., a cloud RAN (C-RAN)). For example, a network node may include one or more of a central unit (CU), a distributed unit (DU), a radio unit (RU), a RAN Intelligent Controller (RIC) (e.g., a Near-Real Time RIC (Near-RT RIC), a Non-Real Time RIC (Non-RT RIC)), a Service Management and Orchestration (SMO) system, or any combination thereof. An RU may also be referred to as a radio head, a smart radio head, a remote radio head (RRH), a remote radio unit (RRU), or a transmission reception point (TRP). One or more components of the network node in a disaggregated RAN architecture may be co-located, or one or more components of the network nodes may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrow band communications), or a combination of these techniques. For example, some UEs 115 may be configured for operation using a narrow band protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some examples, the UE 115 may implement an uplink packet handling protocol for packets including multimedia information. The uplink packet handling protocol may instruct the UE 115 to discard a packet in a queue and transmit a different packet in the queue that was added to the queue after the discarded packet. In one example, the UE 115 may generate a set of packets in the following order: a first uplink packet, a second uplink packet, and a third uplink packet and add the set of packets to the queue according to the same order. Using the uplink packet handling protocol, the UE 115 may discard the first uplink packet and one or both of the second uplink packet or the third uplink packet to a remote server. The methods as described herein may allow the UE 115 to transmit the latest multimedia information to the remote server first which may allow the server to generate video frames based on the most recent multimedia information.

Figure 2:
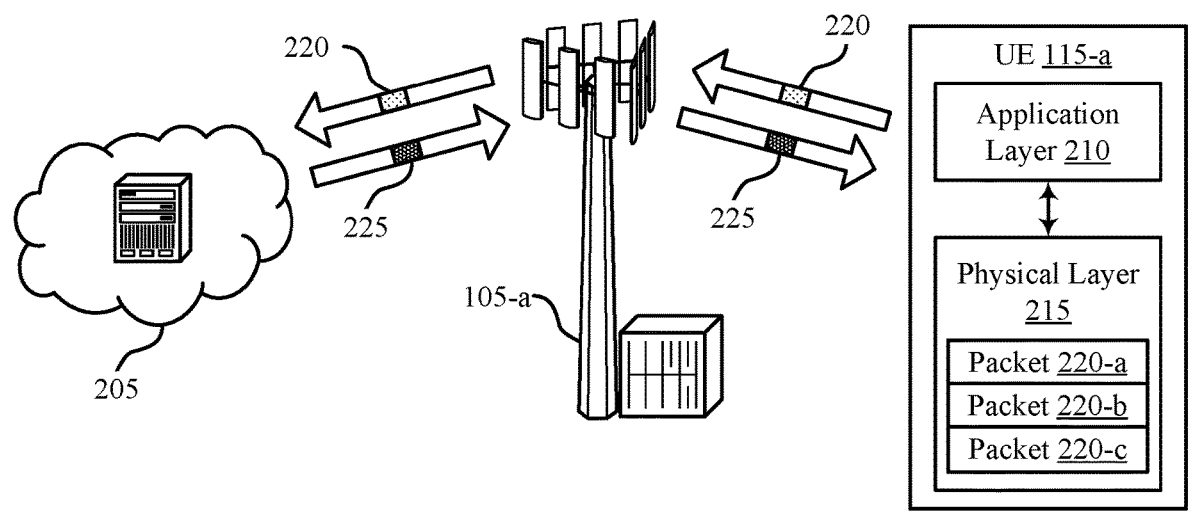

FIG. 2 illustrates an example of a wireless communications system 200 that supports techniques for multimedia uplink packet handling in accordance with aspects of the present disclosure. In some examples, the wireless communications system 200 may implement aspects of a wireless communications system 100. For example, the wireless communications system 200 may include a base station 105-a and a UE 115-a which may be examples of a base station 105 and a UE 115 as described with reference to FIG. 1.

In some examples, the UE 115-a may operate in accordance to a communication model (e.g., an open system interconnection (OSI) model). The communication model may be described as conceptual model that represents the flow of data transfer in a wireless communications system and may be broken down into multiple layers. Examples of the layers may be an application layer 210, a presentation layer, a session layer, a transport layer, a network layer, a data link layer, and a physical layer 215. The application layer 210 is the layer that is closest to the end user. The function of the application layer 210 may be to facilitate communication through the lower layers (e.g., the physical layer 215) in order to establish connections with applications. Additionally, the application layer 210 may include application programming interfaces (APIs) that allow for resource sharing and remote file access. The physical layer 215 may be the lower most layer and may be responsible for the transmission and reception of data using a physical medium (e.g., a channel). In some examples, the application layer 210 may indicate policies to the physical layer 215 and the physical layer 215 may operate in accordance to these policies.

In some examples, the wireless communications system 200 may support cloud gaming or extended reality (XR). Cloud gaming may be described as a type of online gaming in which a video game may be run from a server 205 and streamed to a device (e.g., the UE 115-a). To support cloud gaming, the UE 115-a may transmit controller information (e.g., user input data) to the server 205 and in response to the controller information, the server 205 may transmit a video frame to the UE 115-a. XR, on the other hand, may allow a user to be immersed in a virtual environment (e.g., virtual reality (VR)), augment or add to the user's surrounding (e.g., augmented reality (AR)), or both (e.g., mixed reality (MR)). Examples of XR devices may be VR headsets or AR glasses and in some examples, the UE 115-a may be an example of an XR device. To support XR, the UE 115-a may transmit pose information (e.g., a location of the UE 115-a or an orientation of the UE 115-a) as well as controller information to the server 205 and in response to the pose information and the controller information, the server 205 may transmit a video frame to the UE 115-a.

In some examples, the UE 115-a may not have a direct communication link with the server 205 and may use the base station 105-a to communicate with the server 205. For example, the UE 115-a may transmit a packet 220 (e.g., including the controller information or the pose information) to the base station 105-a and the base station 105-a may relay the packets 220 to the server 205. The server 205 may generate a video frame 225 based on the packet 220 and send the video frame 225 to the base station 105-a, where the base station 105-a may relay the video frame 225 to the UE 115-a. In some examples, downlink traffic (e.g., traffic coming from the base station 105-a to the UE 115-a) may be quasi-periodic with a burst every frame at 1/frame per second. For example, the base station 105-a may transmit 100 or more kilobytes to the UE 115-a at 45 frames per second, 60 frames per second, 75 frames per second, or 90 frames per second. That is, the base station 105-a may transmit 100 or more kilobytes to the UE 115-a every 11, 13, 16, or 22 milliseconds. The frequency of the uplink traffic may be higher than the downlink traffic. For example, unlike in the example of downlink traffic, the UE 115-a may transmit 100 bytes every 2 milliseconds (e.g., 500 hertz) to the base station 105-a.

In some examples, the UE 115-a may be unable to transmit the packet 220 to the base station every 2 milliseconds. Such scenario may occur if the base station 105-a does not provide the UE 115-a with enough uplink grants to transmit the packet 220 every 2 millisecond. If the UE 115-a is unable to transmit the packet 220 every 2 milliseconds, the UE 115-a may start queuing the packets 220. In the example of FIG. 2, the application layer 210 may generate a packet 220-a followed by a packet 220-b followed by a packet 220-c and transmit the packets 220 to the physical layer 215 one at a time. At the physical layer 215, if the UE 115-a does not have enough uplink grants to transmit a packet 220 every 2 milliseconds, the packets 220 may be added to a queue. In some examples, the UE 115-a may add the packets 220 to the queue according to an order in which the packets 220 were generated or when the packets arrived at the physical layer 215. For example, the physical layer 215 may add the packet 220-a to the queue followed by the packet 220-b followed by the packet 220-c. This may result in the packet 220-a being the first packet 220 in the queue, the packet 220-a being the second packet 220 in the queue, and the packet 220-c being the last packet in the queue. The last packet in the queue may include the most recent pose information or controller information.

Using other techniques, the physical layer 215 may transmit packets 220 to the base station 105-a using a first-in-first-out (FIFO). That is, the physical layer 215 may transmit the oldest packet in the queue first. In the example of FIG. 2, using the FIFO policy, the physical layer 215 may transmit the packet 220-a followed by the packet 220-b followed by the packet 220-c. As described above, the server 205 may use the packet 220 to generate the video frame 225. But if the physical layer 215 transmits queued packets 220 using the FIFO policy, the server 205 may not generate a video frame 225 using the most recent controller information or pose information (e.g., the packet 220-c), but instead, the server 205 may generate the video frame 225 using old pose information or controller information (e.g., the packet 220-a). The old pose information or controller information may no longer be applicable to the UE 115-a and therefore, the video frame 225 generated using the old pose information or controller information may be inaccurate.

As described herein, the UE 115-a may utilize an uplink packet handling protocol that may replace the FIFO policy when transmitting packets 220 that include multimedia information (e.g., pose information or controller information). In some examples, the uplink packet handling protocol may be implemented or facilitated by the application layer 210. For example, the application layer 210 may instruct the physical layer 215 to apply the uplink handling protocol to packets 220 stored in the queue. Moreover, the application layer 210 may indicate which packets 220 to apply the uplink packet handling protocol to. For example, the application layer 210 may indicate to apply the uplink packet handling protocol to packets 220 that have a same source and destination IP address, a same user datagram protocol (UDP) port, or a same differentiated services code point (DSCP) marking.

In some examples, the uplink packet handling protocol may indicate to discard a packet 220 in the queue and transmit a different packet 220 that was added to the queue at a later time. As one example, operating in accordance to the uplink packet handling policy, the physical layer 215 may discard the packet 220-a and transmit the packet 220-b or the packet 220-c. In some examples, the uplink packet handling protocol may indicate to transmit queued packets 220 according to a last-in-first-out (LIFO) policy. Using the LIFO policy, the physical layer 215 may transmit a last packet 220 in queue to the base station 105-a before the other packets 220 in the queue. For example, the physical layer 215 may transmit the packet 220-c to the base station 105-a. In some examples, the physical layer 215 may discard the other packets 220 in the queue. For example, the physical layer 215 may discard the packet 220-a and the packet 220-b. Such techniques may improve latency by enabling the server 205 to render video frames 225 using the latest multimedia information.

In some examples, the uplink packet handling protocol may indicate a quantity of packets 220 to keep in the queue. As one example, the uplink packet handling protocol may indicate to keep two packets in the queue. When the quantity of packets 220 in the queue exceeds the quantity indicated by the uplink packet handling protocol, the physical layer 215 may discard the oldest packet 220 and move the most recently generated packet 220 to the head of line in the queue. As one example, the UE 115-a may add the packet 220-a followed by the packet 220-b, followed by the packet 220-c to the queue. If the maximum quantity of packets 220 indicated by the uplink packet handling protocol is two, the physical layer 215 may discard the packet 220-a and transmit the packet 220-c before the packet 220-b. In some examples, the quantity of packets 220 indicated by the uplink packet handling protocol may be based on a rate of change of the multimedia information (e.g., the pose information or the controller information). As the rate of change of the multimedia information increases, the quantity of packets 220 kept in the queue may increase. Using such techniques may allow the server 205 to render video frames using the latest pose information. In addition, such techniques may provide for an efficient use of resources because storing a lower quantity of packets 220 in the queue may consume less resources.

Alternatively, the uplink packet handling protocol may indicate to combine a quantity of packets 220 and transmit the combined packet to the base station 105. In some examples, the packet combining may occur at the application layer 210. The application layer 210 may generate the packets 220 and combine a last quantity of generated packets 220 before sending the combined packet to the physical layer 215. As one example, the uplink packet handling protocol may indicate to combine the last two packets 220. In such example, the application layer 210, may combine the packet 220-b and the packet 220-c and send the combined packet to the physical layer 215. The physical layer 215 may then transmit the combined packet to the base station 105-a. In some example, the packets 220 not involved in the combining may be discarded. For example, the packet 220-a may be discarded. In some examples, the application layer 210 may determine whether packet combining may be useful to the server 205. Additionally or alternatively, the physical layer 215 may recommend to the application layer 210 whether or not to use packet combining. In some example, the physical layer 215 may recommend packet combining based on a condition of a communication link between the base station 105-a and the UE 115-a. If the physical layer 215 determines that the communication link can handle the combined packets and if the link is reliable (e.g., has a corresponding signal strength value above a threshold), the physical layer 215 may recommend packet combining at the application layer 210. Once the application layer 210 receives the recommendation for packet combining from the physical layer 215, the application layer 210 may combine the last quantity of generated packets 220. In some examples, the server 205 may utilize the combined packet to predict multimedia information at the time of rendering the video frame 225. That is, the server 205 may use the combined packet to determine a pattern or rate of change of the multimedia information and render the video frame 225 accordingly. Using such techniques, the server 305 may improve latency by using the latest multimedia information to render video frames 225.

Figure 3A:
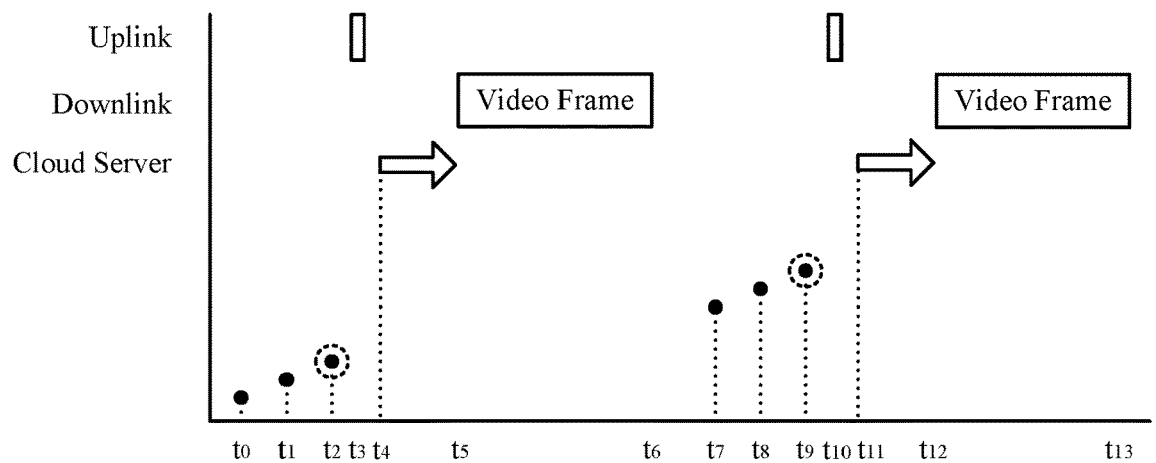
FIGS. 3A, 3B, and 3C illustrate examples of a timing diagram that supports techniques for multimedia uplink packet handling in accordance with aspects of the present disclosure.
Figure 3B:
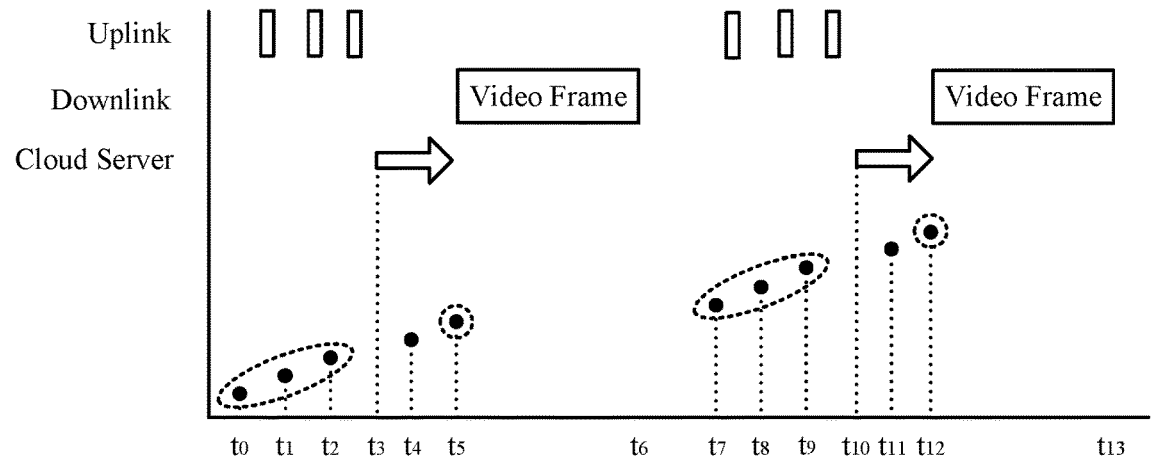
Figure 3C:
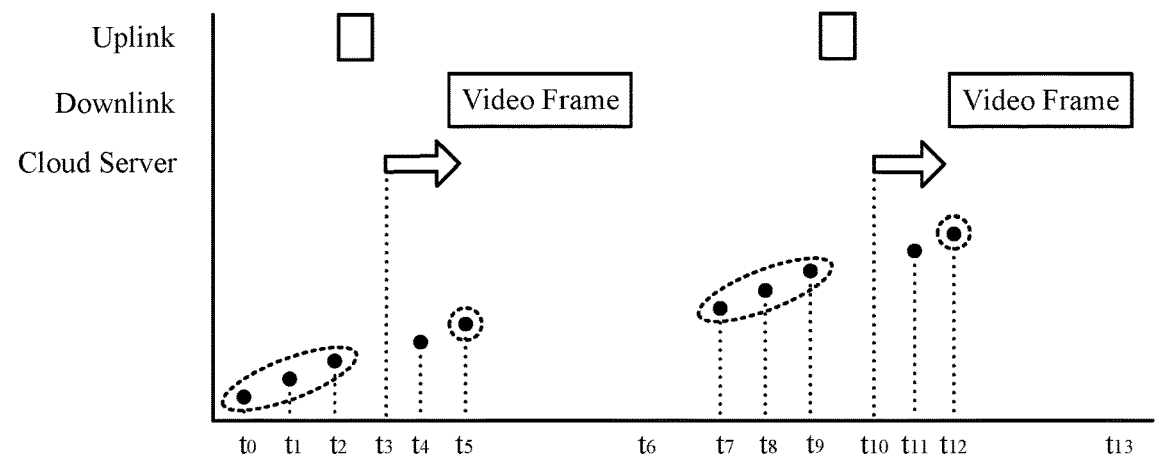

FIGS. 3A, 3B, and 3C illustrate examples of a timing diagram 300 (e.g., a timing diagram 300-a, a timing diagram 300-b, and a timing diagram 300-c) that supports techniques for multimedia uplink packet handling in accordance with aspects of the present disclosure. In some examples, the timing diagram 300-a, the timing diagram 300-b, and the timing diagram 300-c may implement or be implemented by aspects of a wireless communications system 100 and a wireless communications system 200. For example, the timing diagram 300-a, the timing diagram 300-b, and the timing diagram 300-c may be implemented by a UE 115 and a server 205 as described as described with reference to FIGS. 1 and 2.

As described herein, a UE may operate in accordance to an uplink packet handling protocol. The uplink packet handling protocol may instruct the UE on how to transmit multimedia packets to a base station. In some examples, the UE may utilize the uplink packet handing protocol in scenarios where the UE does not receive enough uplink grants to transmit the multimedia packets at a desired rate (e.g., one packet every 2 milliseconds) and thus, queues the multimedia packets. As one example, the uplink packet handling protocol may indicate for the UE to discard at least one packet stored in the queue and transmit, to the base station, one or more packets stored in the queue that were generated at a later time than the at least one packet. In some examples, the UE may receive the uplink packet handling protocol from the base station. In other example, the UE may be preconfigured with the uplink packet handling protocol. Examples of information included in the multimedia packet may be pose information or controller information associated with the UE. An example of pose information may be information obtained from motion capture systems or information obtained from various sensors (e.g., inertial measurement units (IMUs), a pressure sensor pad, a depth sensor, etc.). Motion capture systems may use markers and an array of cameras to determine a position of person's joints. An example of controller information may be inputs or commands from the user (e.g., physical inputs, auditory inputs, etc.)

In the timing diagram 300-a, the UE may generate a first multimedia packet at to, a second multimedia packet at $t_1$, and a third multimedia packet at $t_2$. In some scenarios, the UE may be unable to transmit multimedia packets at a desired rate due to a lack of uplink grants received from the base station and as such, may add the first multimedia packet, the second multimedia packet, and the third multimedia packet to a queue. When the UE receives a grant, the UE may identify a multimedia packet from the queue and transmit the identified multimedia packet to the base station. In some examples, the UE may identify the multimedia packet based on the uplink packet handling protocol. For example, the uplink packet handling protocol may indicate to transmit the queued multimedia packets according to a LIFO order. In such example, the UE may transmit the third multimedia packet to the base station at $t_3$. Additionally, the uplink packet handling protocol may instruct the UE to discard all other multimedia packets in the queue with the exception of the most recently generated uplink packet. As such, the UE may discard the first multimedia packet and the second multimedia packet.

At $t_4$, the server may render a video frame based on the third multimedia packet and at $t_5$, the base station may transmit the video frame to the UE. From $t_7$ to $t_{13}$, the UE may repeat the same process as preformed from $t_0$ to $t_6$. In some examples, the base station may transmit a video frame every 16.66 milliseconds. As such, the time between $t_5$ and $t_{12}$ may be 16.66 milliseconds. In some examples, the UE may enter a sleep mode to decrease power consumption. In sleep mode, the UE may shut down transceiver components (e.g., components used to transmit and receive signals). Because the uplink packet handling protocol may indicate to transmit the most recently generated uplink packet first, the UE may enter the sleep mode after receiving the video frame at to until it transmits the multimedia packet at $t_{10}$. Additionally, the UE may enter the sleep mode while the server is generating the video frame (e.g., from $t_4$ to $t_5$ and $t_{11}$ to $t_{12}$).

In the timing diagram 300-b, the UE may generate a first multimedia packet at to, a second multimedia packet at $t_1$, and a third multimedia packet at $t_2$, where the first multimedia packet, the second multimedia packet, and the third multimedia packet are the last multimedia packets generated at the UE before the server renders a video frame at $t_3$. In some scenarios, the UE may receive enough uplink grants to transmit the multimedia packets at a desired rate. As one example, the UE may obtain enough uplink grants to transmit a multimedia packet every 2 milliseconds. If the UE obtains enough grants to transmit the multimedia packets at the desired rate, the uplink packet handling protocol may indicate to transmit the last few multimedia packets generated before the server starts video frame rendering (e.g., at $t_3$). For example, as shown in timing diagram 300-b, the uplink packet handling protocol may instruct the UE to transmit the last three multimedia packets generated. As such, in response to the uplink packet handling protocol, the UE may transmit the first multimedia packet, the second multimedia packet, and the third multimedia packet to the base station at the desired rate (e.g., every 2 milliseconds). Additionally, the uplink packet handling protocol may instruct the UE to discard all other multimedia packets generated before the last three multimedia packets (e.g., before to or before).

After receiving the first multimedia packet, the second multimedia packet, and the third multimedia packet, the server may render the video frame. In some examples, the server may use the first multimedia packet, the second multimedia packet, and the third multimedia packet to predict multimedia information associated with the UE at the time that the video frame is to be transmitted. In some examples, the UE may continue to generate multimedia packets after generating the first multimedia packet, the second multimedia packet, and the third multimedia packet. For example, the UE may generate a fourth multimedia packet at $t_4$ and a fifth multimedia packet at $t_5$. The fifth multimedia may include the most accurate multimedia information. Using the first multimedia packet, the second multimedia packet, and the third multimedia packet, the server may predict multimedia information comparable to the multimedia information included in the fifth multimedia packet that the UE generates at $t_5$. In some examples, the multimedia information may follow some sort of pattern. For example, it may be reasonable to assume that a UE moving in one direction for a prolonged period of time would continue to move in the same direction in a similar manner. The server may deduce the pattern from the first multimedia packet, the second multimedia packet, and the third multimedia packet and estimate the future multimedia information (e.g., the multimedia information included in the fifth multimedia packet) from this pattern.

After generating the video frame, the server may transmit the video frame to the base station and the base station may transmit the video frame to the UE. From $t_7$ to $t_{13}$, the UE may repeat the same process as preformed from $t_0$ to $t_6$. In some examples, the base station may transmit a video frame every 16.66 milliseconds. As such, the time between transmitting the video frames shown in timing diagram 300-b may be 16.66 milliseconds. In some examples, the UE may enter a sleep mode to decrease power consumption. In sleep mode, the UE may shut down transceiver components (e.g., components used to transmit and receive signals). Because the uplink packet handling protocol may indicate to transmit a few of the last generated packets, the UE may enter the sleep mode after receiving the video frame at to until it transmits the multimedia packet generated at $t_7$. Additionally, the UE may enter the sleep mode while the server is generating the video frame.

In the timing diagram 300-c, the UE may generate a first multimedia packet at to, a second multimedia packet at $t_1$, and a third multimedia packet at $t_2$, where the first multimedia packet, the second multimedia packet, and the third multimedia packet are the last multimedia packets generated at the UE before the server renders a video frame at $t_3$. In some scenarios, the UE may be unable to transmit multimedia packets at a desired rate due to a lack of uplink grants received from the base station and as such, may add the first multimedia packet, the second multimedia packet, and the third multimedia packet to a queue. If the UE is unable to transmit the multimedia packets at the desired rate, the uplink packet handling protocol may indicate to combine the last few multimedia packets generated before the server starts video frame rendering at $t_3$. For example, as shown in timing diagram 300-c, the uplink packet handling protocol may instruct the UE to combine the last three multimedia packet generated. As such, in response to the uplink packet handling protocol, the UE may combine the first multimedia packet, the second multimedia packet, and the third multimedia packet and transmit the combined packet to the base station. Additionally, the uplink packet handling protocol may instruct the UE to discard all other multimedia packets generated before the last three multimedia packets (e.g., before to or before $t_7$). In some examples, the UE may determine whether to implement the uplink packet handling protocol based on one or more conditions being satisfied. For example, the UE may determine to implement the uplink packet handling protocol if a link condition link between the UE and the base station satisfies a threshold (e.g., an reference signal received power (RSRP) value associated with the link is above a threshold). If the one or more conditions are not met, the UE may not implement the uplink packet handling protocol. That is, the UE may not perform multimedia packet combining.

After receiving the combined packet, the server may render the video frame. In some examples, the server may use the combined packet to predict multimedia information associated with the UE at the time that the video frame is to be transmitted. In some examples, the UE may continue to generate multimedia packets after generating the first multimedia packet, the second multimedia packet, and the third multimedia packet. For example, the UE may generate a fourth multimedia packet at $t_4$ and a fifth multimedia packet at $t_5$. The fifth multimedia packet may include the most accurate multimedia information. Using the combined packet, the server may predict multimedia information comparable to the multimedia information included in the fifth multimedia packet that the UE generates at $t_5$. In some examples, the multimedia information may follow some sort of pattern. For example, it may be reasonable to assume that a UE moving in one direction for a prolonged period of time would continue to move in that the same direction in a similar manner. The server may deduce the pattern from the combined multimedia packet and estimate the future multimedia information (e.g., the multimedia information included in the fifth multimedia packet) from this pattern.

After generating the video frame, the server may transmit the video frame to the base station and the base station may transmit the video frame to the UE. From $t_7$ to $t_{13}$, the UE may repeat the same process as preformed from $t_0$ to $t_6$. In some examples, the base station may transmit a video frame every 16.66 milliseconds. As such, the time between the video frames shown in timing diagram 300-*c* may be 16.66 milliseconds. In some examples, the UE may enter a sleep mode to decrease power consumption. In sleep mode, the UE may shut down transceiver components (e.g., components used to transmit and receive signals). Because the uplink packet handling protocol may indicate to transmit the combined multimedia packet, the UE may enter the sleep mode after receiving the video frame at to until the UE transmits the next combined multimedia packet. Additionally, the UE may enter the sleep mode while the server is generating the video frame. Using the methods as described herein may reduce latency associated with multimedia traffic as well as enhance over the air (OTA) efficiency.

Figure 4:
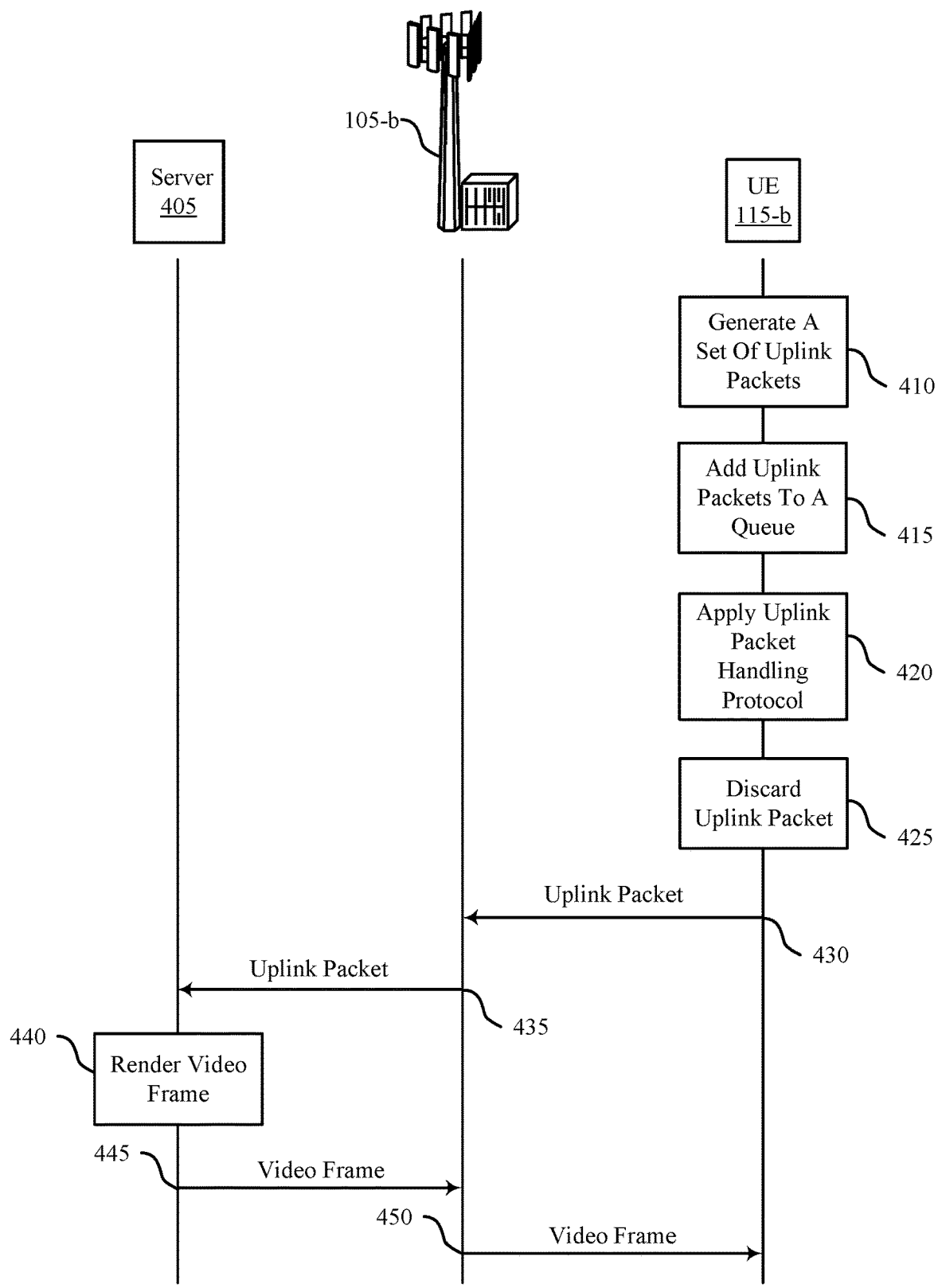
FIG. 4 illustrates an example of a process flow that supports techniques for multimedia uplink packet handling in accordance with aspects of the present disclosure.

FIG. 4 illustrates an example of a process flow 400 that supports techniques for multimedia uplink packet handling in accordance with aspects of the present disclosure. In some examples, the process flow 400 may implement or be implemented by aspects of a wireless communications system 100 and a wireless communications system 200. For example, the process flow 400 may include a server 405, a base station 105-*b*, and a UE 115-*a* which may be examples of a server 205, a base station 105, and a UE 115 as described in FIGS. 1 and 2. Alternative examples of the following may be implemented, where some steps are performed in a different order than described or are not performed at all. In some cases, steps may include additional features not mentioned below, or further steps may be added.

At 410, the UE 115-*b* may generate multiple uplink packets including multimedia information. The multiple uplink packets may include at least a first set of uplink packets and a second set of uplink packets. The first set of uplink packets may include at least a first uplink packet, a second uplink packet, and a third uplink packet. The UE 115-*b* may generate the first uplink packet before the second uplink packet and the second uplink packet before the third uplink packet. Examples of the multimedia information included in the uplink packets may be one or both of pose information (e.g., a location of the UE 115-*b* or an orientation of the UE 115-*b*) or controller information (e.g., user input data). In some examples, the uplink packets included in the first set of uplink packets (e.g., the first uplink packet, the second uplink packet, and the third uplink packet) may correspond to a same source IP address, destination IP address, user datagram protocol port, or differentiated services code point marking. Additionally, the uplink packets included in the second set of uplink packets may correspond to a same source IP address, destination IP address, user datagram protocol port, or differentiated services code point marking.

At 415, the UE 115-*b* may add the multiple uplink packets to a queue. The UE 115-*b* may add the multiple uplink packets to the queue because the UE 115-*b* may not have enough uplink resource grants to transmit the multiple uplink packets to the base station 105-*b* at a desired rate (e.g., one packet every 2 milliseconds). In some examples, the UE 115-*b* may add the multiple uplink packets to the queue according to an order in which the uplink packets are generated. For example, in the example of the first set of uplink packets, the UE 115-*b* may add the first uplink packet to the queue followed by the second uplink packet and followed by the third uplink packet.

At 420, the UE 115-*b* may apply an uplink packet handling protocol to the multiple uplink packets. In some examples, the UE 115-*b* may apply the uplink packet handling protocol to a particular set of uplink packets, For example, the UE 115-*b* may apply the uplink packet handling protocol to the first set of uplink packets. That is, the UE 115-*b* may apply the uplink packet handling protocol to a set of uplink packets that correspond to a same source IP address, destination IP address, UDP port, or DSCP point marking. In some examples, the UE 115-*b* may receive signaling from the base station 105-*b* indicating the packet handling protocol. Additionally or alternatively, the UE 115-*b* may receive signaling from the base station 105-*b* indicating which set of uplink packets to apply the uplink packet handling protocol to. As an example, the base station 105-*b* may transmit signaling indicating a destination IP address, a source IP address, a UDP port, or a DSCP marking and the UE 115-*b* may apply the uplink packet handling protocol that correspond to the indicated destination IP address, source IP address, UDP port, or DSCP marking.

At 425, based on the uplink packet handling protocol, the UE 115-*b* may discard at least one uplink packet in the queue and transmit, to the base station 105-*b*, one or more packets in the queue that were generated before the at least one uplink packet. In some examples, the uplink packet handling protocol may indicate which uplink packet or packets in the queue are to be transmitted and which uplink packet or packets in the queue are to be discarded. As one example, the uplink packet handling protocol may instruct the UE 115-*b* to transmit the uplink packets in the queue according to a LIFO order. Using the LIFO order, the UE 115-*b* may transmit the last uplink packet in the queue first (e.g., the third uplink packet) and, in some examples, discard one or more other uplink packets in the queue (e.g., one or both of the second uplink packet or the first uplink packet).

Additionally or alternatively, the uplink packet handling protocol may indicate a quantity of uplink packet for the UE 115-*b* to maintain in the queue. If the queue exceeds quantity of uplink packets, the UE 115-*b* may discard the oldest uplink packet in the queue and move the last uplink packet added to the queue to the head of line in the queue. For example, if the uplink packet handling protocol indicates to maintain two uplink packets in the queue, the UE 115-*b* may discard the first uplink packet and move the third uplink packet to the head of the line in the queue. In some examples, the UE 115-*b* or the base station 105-*b* may determine the quantity of uplink packets to maintain in the queue based on a rate of change of the multimedia information. Additionally, the uplink packet handling protocol may instruct the UE 115-*b* to discard the one or more other uplink packets in the queue. As an example, the UE 115-*b* may discard oldest uplink packet in the queue (e.g., the first uplink packet).

Additionally or alternatively, the uplink packet handling protocol may instruct the UE 115-*b* to combine the last two or more uplink packets added to the queue and transmit the combined packet to the base station 105-*a*. As one example, the uplink packet handling protocol may indicate to combine the last two uplink packets in the queue. In such example, the UE 115-*b* may combine the second uplink packet and the third uplink packet and transmit the combined packet. In some examples, the UE 115-*b* may determine whether to implement the uplink packet handling protocol based on one or more conditions being met. In one example, the UE 115-*b* may implement the uplink packet handling protocol if a link between the base station 105-b and the UE 115-b can accommodate the combined packet and if the link is reliable. The link may be deemed reliable if a signal strength value (e.g., a received signal strength indicator (RSSI) value, an RSRP value, or a reference signal received quality (RSRQ) value) associated with the link satisfies a threshold (e.g., is above the threshold). Additionally, the uplink packet handling protocol may instruct the UE 115-b to discard the one or more other uplink packets in the queue. As an example, the UE 115-b may discard oldest uplink packet in the queue (e.g., the first uplink packet).

At 430, the UE 115-b may transmit an uplink packet to the base station 105-b according to the uplink packet handling protocol. In some examples, the UE 115-b may transmit the last uplink packet added to the queue (e.g., the third uplink packet). In another example, the UE 115-b may transmit a bundled packet (e.g., a super packet) to the base station 105-b. The bundled packet may include the multimedia information included in the last two or more uplink packets in the queue. As an example, the bundled packet may include multimedia information included in the second uplink packet and the third uplink packet.

At 435, the base station 105-b may forward or transmit the uplink packet to the server 405 and at 440, the server 405 may render a video frame using the multimedia information included in the uplink packet received from the base station 105-b. In some examples, the server may estimate future multimedia information based on the multimedia information included in the uplink packet and use the estimated future multimedia information to render the video frame. After rendering the video frame, the server 405 may transmit the video frame to the base station 105-b at 445 and the base station 105-b may forward or transmit the video frame to the UE 115-b at 450.

Figure 5:
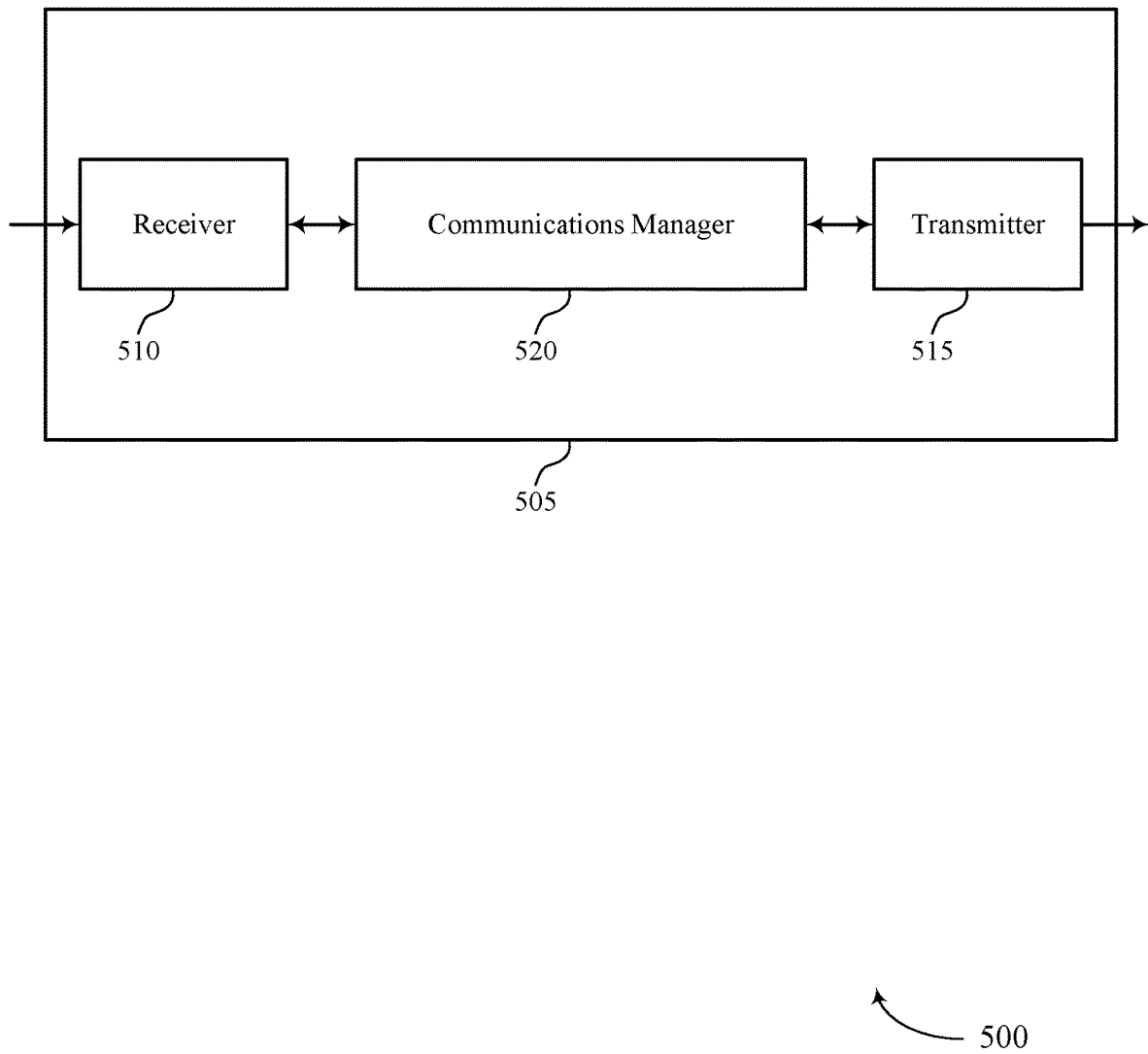
FIGS. 5 and 6 show block diagrams of devices that support techniques for multimedia uplink packet handling in accordance with aspects of the present disclosure.

FIG. 5 shows a block diagram 500 of a device 505 that supports techniques for multimedia uplink packet handling in accordance with aspects of the present disclosure. The device 505 may be an example of aspects of a UE 115 as described herein. The device 505 may include a receiver 510, a transmitter 515, and a communications manager 520. The device 505 may also include one or more processors, memory coupled with the one or more processors, and instructions stored in the memory that are executable by the one or more processors to enable the one or more processors to perform multimedia uplink packet handling. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for multimedia uplink packet handling). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for multimedia uplink packet handling). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for multimedia uplink packet handling as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for generating a set of multiple uplink packets including multimedia information, the set of multiple uplink packets including at least a first set of uplink packets and a second set of uplink packets, where the first set of uplink packets includes a first uplink packet and a second uplink packet, and where the first uplink packet is generated before the second uplink packet. The communications manager 520 may be configured as or otherwise support a means for adding the set of multiple uplink packets to a queue according to an order in which the set of multiple uplink packets are generated. The communications manager 520 may be configured as or otherwise support a means for applying an uplink packet handling protocol to the first set of uplink packets. The communications manager 520 may be configured as or otherwise support a means for discarding the first uplink packet based on the uplink packet handling protocol. The communications manager 520 may be configured as or otherwise support a means for transmitting, to a network node, the second uplink packet including the multimedia information based on the uplink packet handling protocol. The communications manager 520 may be configured as or otherwise support a means for receiving, from the network node, a video frame in response to transmitting the second uplink packet.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced power consumption and more efficient utilization of communication resources. The method as described herein may allow a device 505 to power down transceiver components during periods of time when the device 505 is not transmitting multimedia packets and while a server is rendering a video frame which may reduce power consumption at the device 505. In addition, the methods as described herein may allow the device 505 to reduce a quantity of packets stored in a queue which may free up or reduce resources allocated to the queue.

Figure 6:
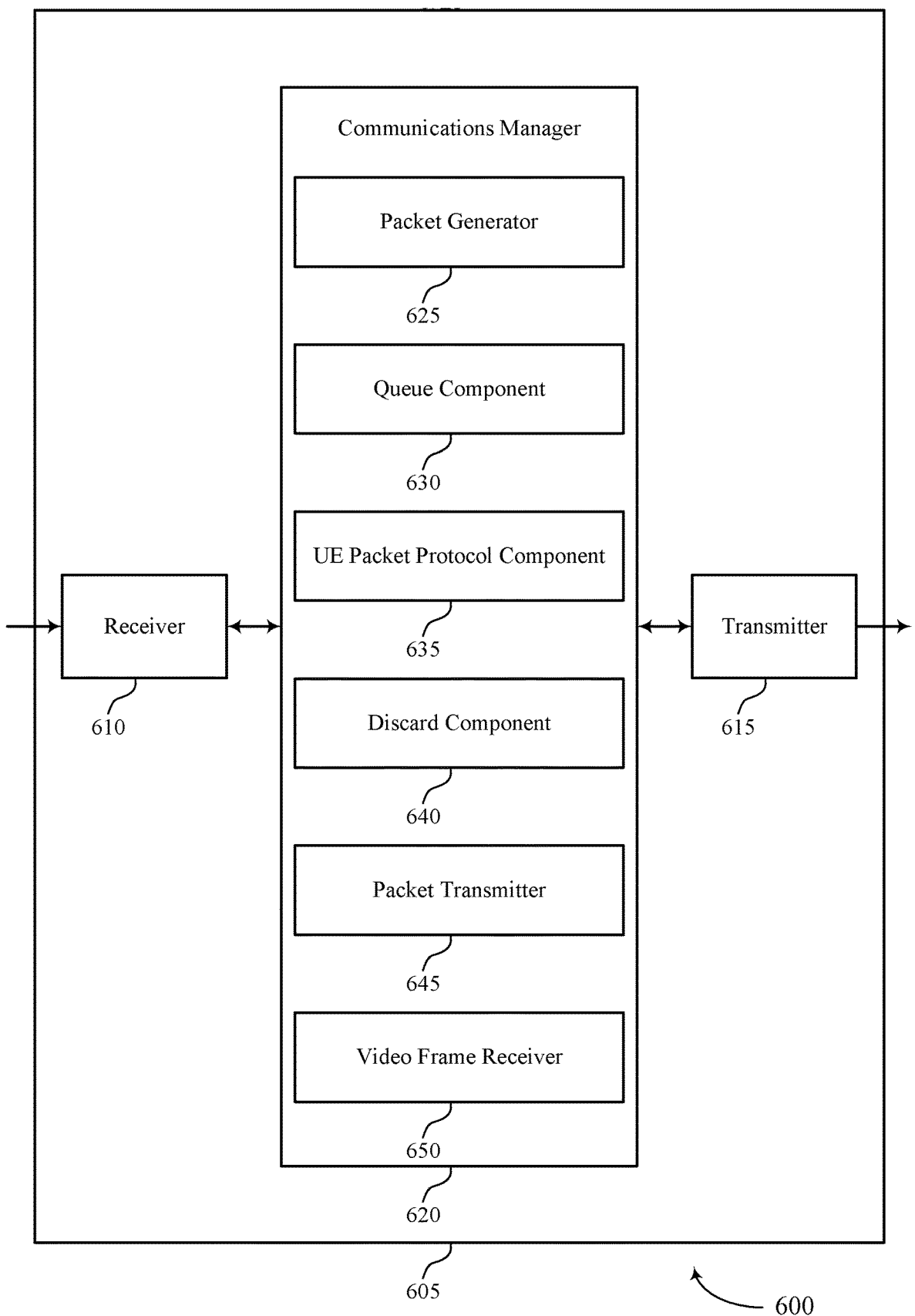

FIG. 6 shows a block diagram 600 of a device 605 that supports techniques for multimedia uplink packet handling in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for multimedia uplink packet handling). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for multimedia uplink packet handling). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for multimedia uplink packet handling as described herein. For example, the communications manager 620 may include a packet generator 625, a queue component 630, a UE packet protocol component 635, a discard component 640, a packet transmitter 645, a video frame receiver 650, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The packet generator 625 may be configured as or otherwise support a means for generating a set of multiple uplink packets including multimedia information, the set of multiple uplink packets including at least a first set of uplink packets and a second set of uplink packets, where the first set of uplink packets includes a first uplink packet and a second uplink packet, and where the first uplink packet is generated before the second uplink packet. The queue component 630 may be configured as or otherwise support a means for adding the set of multiple uplink packets to a queue according to an order in which the set of multiple uplink packets are generated. The UE packet protocol component 635 may be configured as or otherwise support a means for applying an uplink packet handling protocol to the first set of uplink packets. The discard component 640 may be configured as or otherwise support a means for discarding the first uplink packet based on the uplink packet handling protocol. The packet transmitter 645 may be configured as or otherwise support a means for transmitting, to a network node, the second uplink packet including the multimedia information based on the uplink packet handling protocol. The video frame receiver 650 may be configured as or otherwise support a means for receiving, from the network node, a video frame in response to transmitting the second uplink packet.

In some cases, the packet generator 625, the queue component 630, the UE packet protocol component 635, the discard component 640, the packet transmitter 645, and the video frame receiver 650 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the packet generator 625, the queue component 630, the UE packet protocol component 635, the discard component 640, the packet transmitter 645, and the video frame receiver 650 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 7:
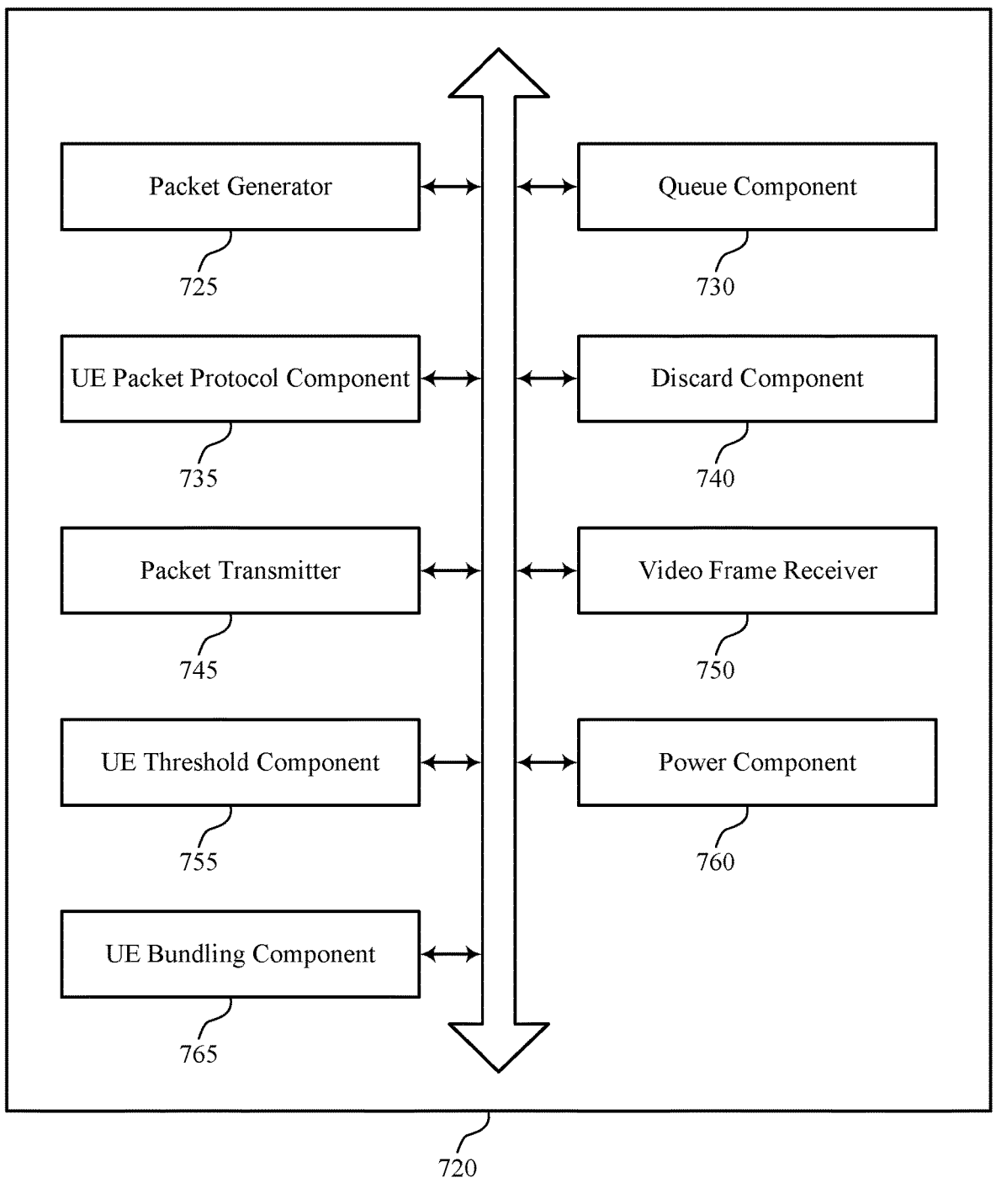
FIG. 7 shows a block diagram of a communications manager that supports techniques for multimedia uplink packet handling in accordance with aspects of the present disclosure.

FIG. 7 shows a block diagram 700 of a communications manager 720 that supports techniques for multimedia uplink packet handling in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for multimedia uplink packet handling as described herein. For example, the communications manager 720 may include a packet generator 725, a queue component 730, a UE packet protocol component 735, a discard component 740, a packet transmitter 745, a video frame receiver 750, a UE threshold component 755, a power component 760, a UE bundling component 765, or any combination thereof. Each of these components may communicate, directly or indirectly, with one another (e.g., via one or more buses).

The communications manager 720 may support wireless communication at a UE in accordance with examples as disclosed herein. The packet generator 725 may be configured as or otherwise support a means for generating a set of multiple uplink packets including multimedia information, the set of multiple uplink packets including at least a first set of uplink packets and a second set of uplink packets, where the first set of uplink packets includes a first uplink packet and a second uplink packet, and where the first uplink packet is generated before the second uplink packet. The queue component 730 may be configured as or otherwise support a means for adding the set of multiple uplink packets to a queue according to an order in which the set of multiple uplink packets are generated. The UE packet protocol component 735 may be configured as or otherwise support a means for applying an uplink packet handling protocol to the first set of uplink packets. The discard component 740 may be configured as or otherwise support a means for discarding the first uplink packet based on the uplink packet handling protocol. The packet transmitter 745 may be configured as or otherwise support a means for transmitting, to a network node, the second uplink packet including the multimedia information based on the uplink packet handling protocol. The video frame receiver 750 may be configured as or otherwise support a means for receiving, from the network node, a video frame in response to transmitting the second uplink packet.

In some examples, the UE operates in accordance to a communication model, and the UE packet protocol component 735 may be configured as or otherwise support a means for transmitting signaling indicating the uplink packet handling protocol from the application to the physical layer.

In some examples, the UE packet protocol component 735 may be configured as or otherwise support a means for receiving, from the network node, signaling indicating the uplink packet handling protocol.

In some examples, the first set of uplink packet includes uplink packets that correspond to one or more of a same source IP address, destination IP address, UDP port, or DSCP marking. In some examples, the second uplink packet is a last uplink packet added to the queue.

In some examples, the UE threshold component 755 may be configured as or otherwise support a means for identifying a threshold quantity of the first set of uplink packets that can be kept in the queue based on the uplink packet handling protocol, where discarding the first uplink packet is in response to a quantity corresponding to the first set of uplink packets exceeding the threshold quantity of uplink packets.

In some examples, the threshold quantity of the first set of uplink packets is based on a rate of change of the multimedia information. In some examples, the first set of uplink packets further includes a third uplink packet, the third uplink packet generated after the second uplink packet.

In some examples, the UE bundling component 765 may be configured as or otherwise support a means for bundling the second uplink packet and the third uplink packet based on a link quality of a link between the UE and the network node satisfying a threshold, where transmitting the second uplink packet includes transmitting the bundled uplink packet to the network node. In some examples, the second uplink packet and the third uplink packet are the last two uplink packets of the first set of uplink packets to be added to the queue.

In some examples, the power component 760 may be configured as or otherwise support a means for powering off one or more transceiver components at the UE for a duration, the duration including a time between transmitting the second uplink packet and receiving the video frame or a time between receiving a second video frame and transmitting the second uplink packet, where the second video frame is received before the video frame. In some examples, the multimedia information includes a location of the UE, an orientation of the UE, a set of user inputs, or a combination thereof.

In some cases, the packet generator 725, the queue component 730, the UE packet protocol component 735, the discard component 740, the packet transmitter 745, the video frame receiver 750, the UE threshold component 755, the power component 760, and the UE bundling component 765 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the packet generator 725, the queue component 730, the UE packet protocol component 735, the discard component 740, the packet transmitter 745, the video frame receiver 750, the UE threshold component 755, the power component 760, and the UE bundling component 765 discussed herein.

Figure 8:
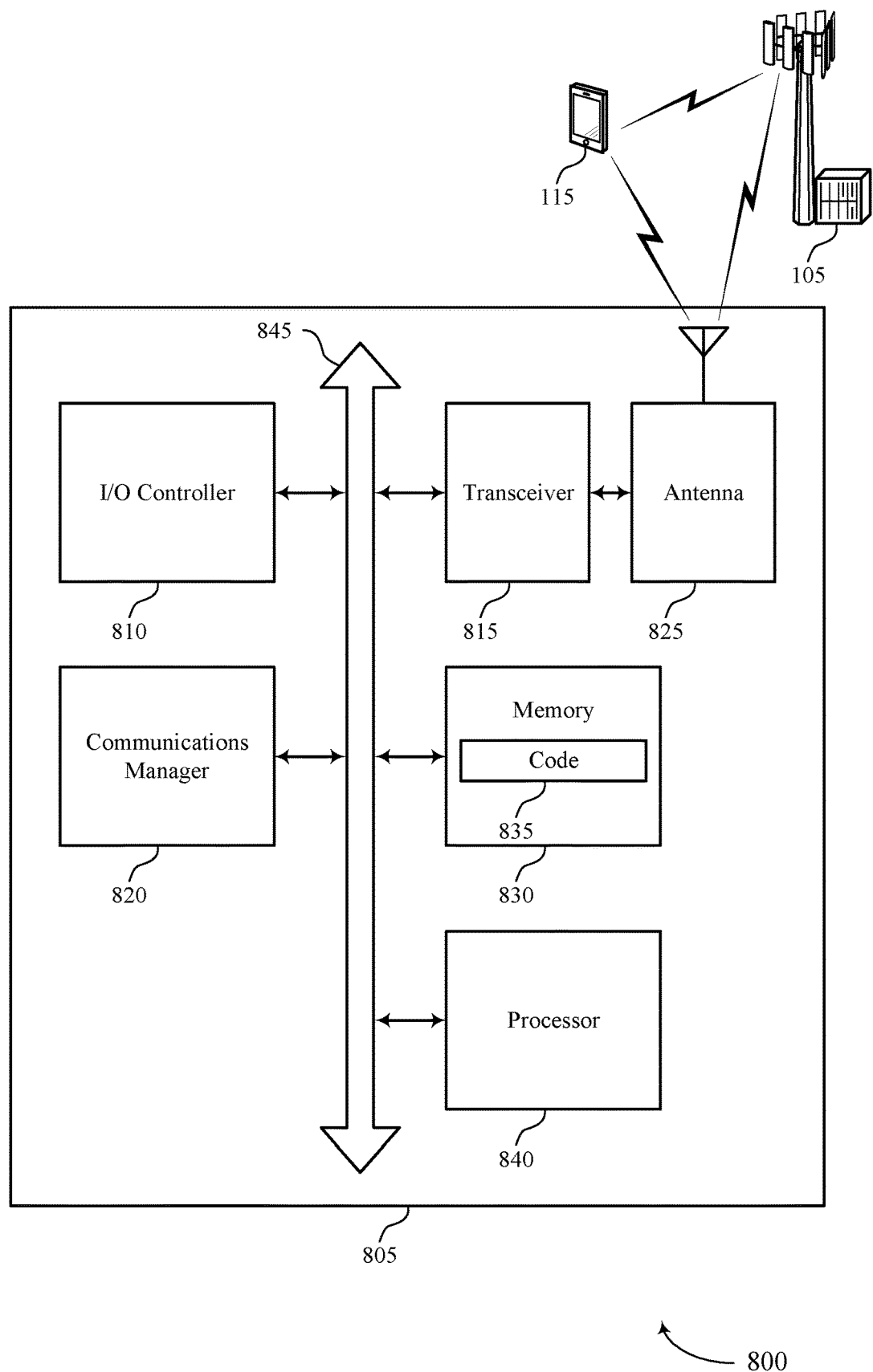
FIG. 8 shows a diagram of a system including a device that supports techniques for multimedia uplink packet handling in accordance with aspects of the present disclosure.

FIG. 8 shows a diagram of a system 800 including a device 805 that supports techniques for multimedia uplink packet handling in accordance with aspects of the present disclosure. The device 805 may be an example of or include the components of a device 505, a device 605, or a UE 115 as described herein. The device 805 may communicate wirelessly with one or more base stations 105 (or network nodes), UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for multimedia uplink packet handling). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for generating a set of multiple uplink packets including multimedia information, the set of multiple uplink packets including at least a first set of uplink packets and a second set of uplink packets, where the first set of uplink packets includes a first uplink packet and a second uplink packet, and where the first uplink packet is generated before the second uplink packet. The communications manager 820 may be configured as or otherwise support a means for adding the set of multiple uplink packets to a queue according to an order in which the set of multiple uplink packets are generated. The communications manager 820 may be configured as or otherwise support a means for applying an uplink packet handling protocol to the first set of uplink packets. The communications manager 820 may be configured as or otherwise support a means for discarding the first uplink packet based on the uplink packet handling protocol. The communications manager 820 may be configured as or otherwise support a means for transmitting, to a network node, the second uplink packet including the multimedia information based on the uplink packet handling protocol. The communications manager 820 may be configured as or otherwise support a means for receiving, from the network node, a video frame in response to transmitting the second uplink packet.

By including or configuring the communications manager 820 in accordance with examples as described herein, the device 805 may support techniques for reduced power consumption, more efficient utilization of communication resources, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for multimedia uplink packet handling as described herein, or the processor 840 and the memory 830 may be otherwise configured to perform or support such operations.

Figure 9:
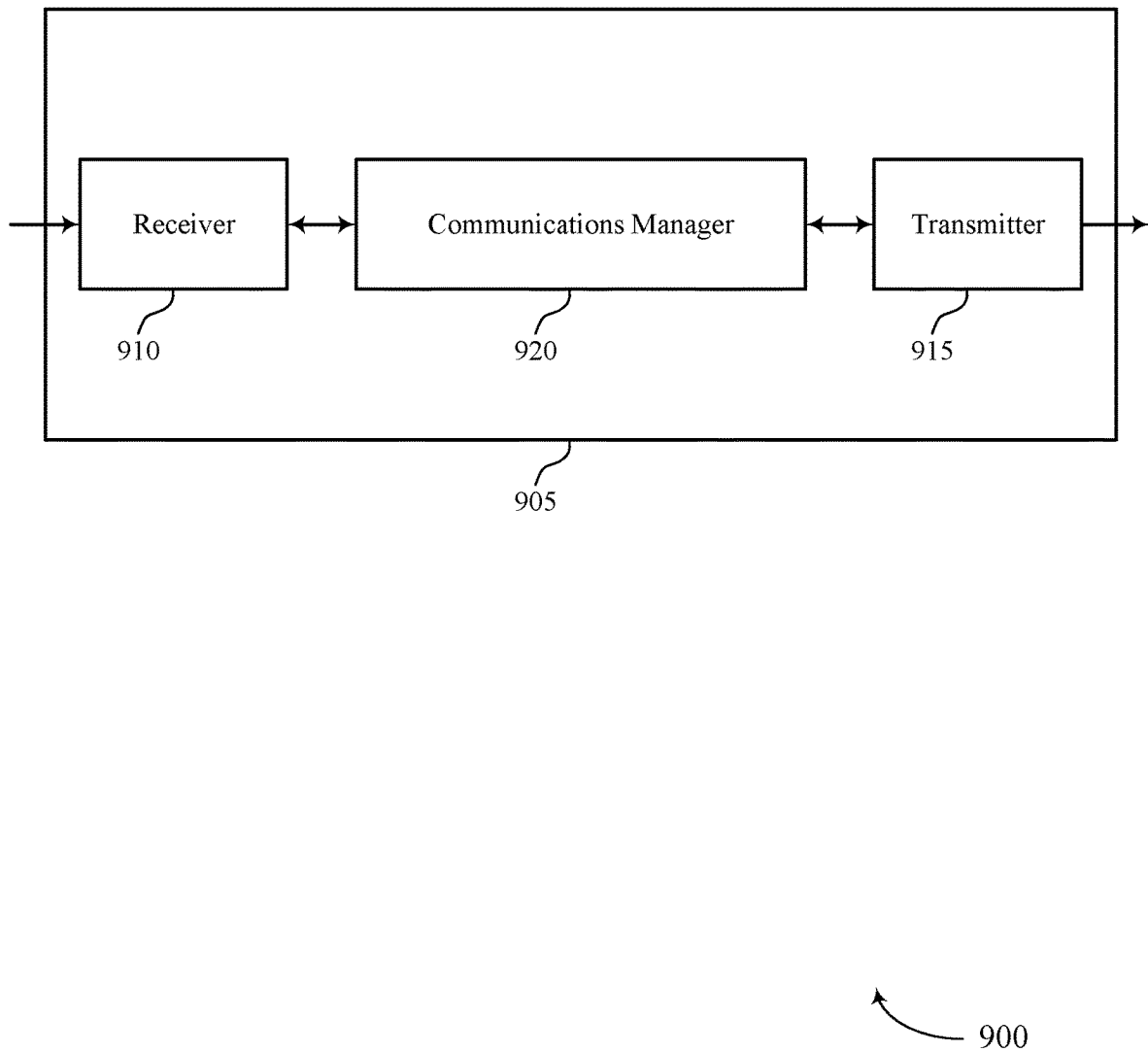
FIGS. 9 and 10 show block diagrams of devices that support techniques for multimedia uplink packet handling in accordance with aspects of the present disclosure.

FIG. 9 shows a block diagram 900 of a device 905 that supports techniques for multimedia uplink packet handling in accordance with aspects of the present disclosure. The device 905 may be an example of aspects of a base station 105 (or a network node) as described herein. The device 905 may include a receiver 910, a transmitter 915, and a communications manager 920. The device 905 may also include one or more processors, memory coupled with the one or more processors, and instructions stored in the memory that are executable by the one or more processors to enable the one or more processors to perform multimedia uplink packet handling. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for multimedia uplink packet handling). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for multimedia uplink packet handling). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for multimedia uplink packet handling as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a network node in accordance with examples as disclosed herein. For example, the communications manager 920 may be configured as or otherwise support a means for transmitting signaling indicating an uplink packet handling protocol to apply to a first set of uplink packets including multimedia information, the first set of uplink packets including a first uplink packet and a second uplink packet. The communications manager 920 may be configured as or otherwise support a means for receiving the second uplink packet including the multimedia information according to the uplink packet handling protocol. The communications manager 920 may be configured as or otherwise support a means for transmitting a video frame in response to receiving the second uplink packet.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for more efficient utilization of communication resources.

Figure 10:
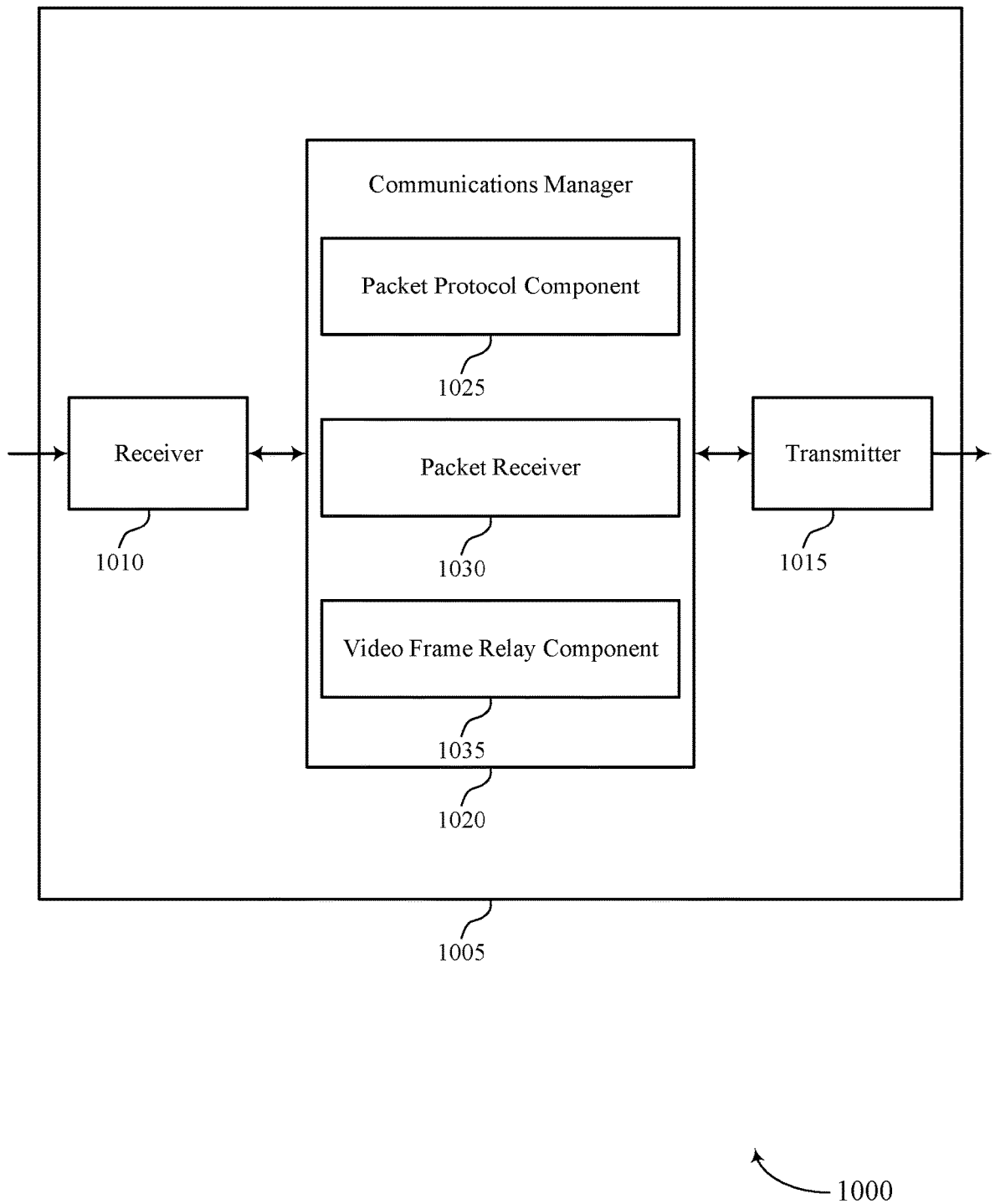

FIG. 10 shows a block diagram 1000 of a device 1005 that supports techniques for multimedia uplink packet handling in accordance with aspects of the present disclosure. The device 1005 may be an example of aspects of a device 905 or a base station 105 (or a network node) as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for multimedia uplink packet handling). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for multimedia uplink packet handling). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for multimedia uplink packet handling as described herein. For example, the communications manager 1020 may include a packet protocol component 1025, a packet receiver 1030, a video frame relay component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a network node in accordance with examples as disclosed herein. The packet protocol component 1025 may be configured as or otherwise support a means for transmitting signaling indicating an uplink packet handling protocol to apply to a first set of uplink packets including multimedia information, the first set of uplink packets including a first uplink packet and a second uplink packet. The packet receiver 1030 may be configured as or otherwise support a means for receiving the second uplink packet including the multimedia information according to the uplink packet handling protocol. The video frame relay component 1035 may be configured as or otherwise support a means for transmitting a video frame in response to receiving the second uplink packet.

In some cases, the packet protocol component 1025, the packet receiver 1030, and the video frame relay component 1035 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the packet protocol component 1025, the packet receiver 1030, and the video frame relay component 1035 discussed herein. A transceiver processor may be collocated with and/or communicate with (e.g., direct the operations of)

a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 11:
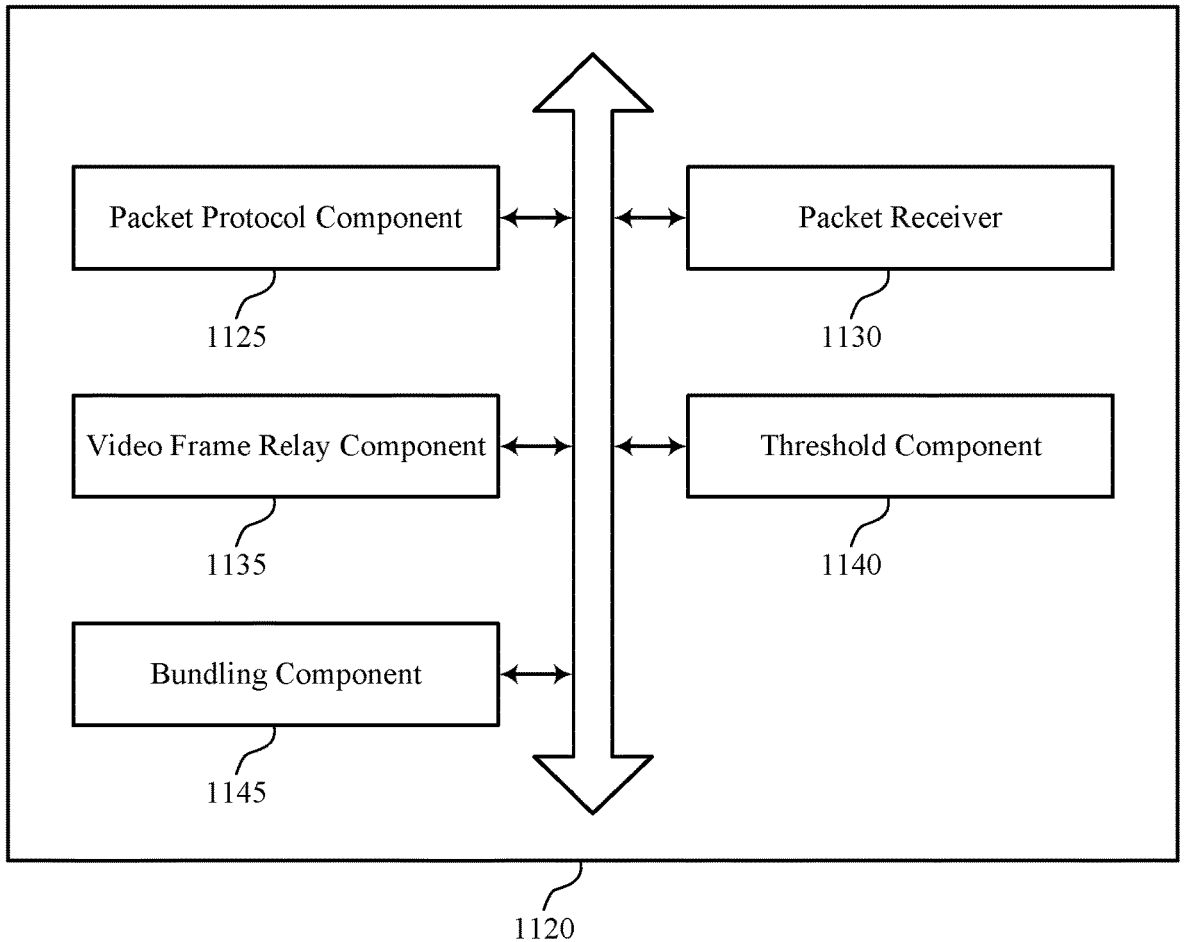
FIG. 11 shows a block diagram of a communications manager that supports techniques for multimedia uplink packet handling in accordance with aspects of the present disclosure.

FIG. 11 shows a block diagram 1100 of a communications manager 1120 that supports techniques for multimedia uplink packet handling in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for multimedia uplink packet handling as described herein. For example, the communications manager 1120 may include a packet protocol component 1125, a packet receiver 1130, a video frame relay component 1135, a threshold component 1140, a bundling component 1145, or any combination thereof. Each of these components may communicate, directly or indirectly, with one another (e.g., via one or more buses).

The communications manager 1120 may support wireless communications at a network node in accordance with examples as disclosed herein. The packet protocol component 1125 may be configured as or otherwise support a means for transmitting signaling indicating an uplink packet handling protocol to apply to a first set of uplink packets including multimedia information, the first set of uplink packets including a first uplink packet and a second uplink packet. The packet receiver 1130 may be configured as or otherwise support a means for receiving the second uplink packet including the multimedia information according to the uplink packet handling protocol. The video frame relay component 1135 may be configured as or otherwise support a means for transmitting a video frame in response to receiving the second uplink packet. In some examples, the first set of uplink packets includes uplink packets that correspond to one or more of a same source IP address, destination IP address, UDP port, or DSCP marking.

In some examples, the threshold component 1140 may be configured as or otherwise support a means for transmitting signaling indicating a threshold quantity of uplink packets of the first set of uplink packet that can be kept in a queue. In some examples, the threshold quantity of uplink packets is based on a rate of change of the multimedia information.

In some examples, to support receiving the second uplink packet, the bundling component 1145 may be configured as or otherwise support a means for receiving the second uplink packet bundled with a third uplink packet, where the first set of uplink packets further includes the third uplink packet. In some examples, the multimedia information includes a location of the UE, an orientation of the UE, a set of user inputs, or a combination thereof.

In some cases, the packet protocol component 1125, the packet receiver 1130, the video frame relay component 1135, the threshold component 1140, and the bundling component 1145 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the packet protocol component 1125, the packet receiver 1130, the video frame relay component 1135, the threshold component 1140, and the bundling component 1145 discussed herein.

Figure 12:
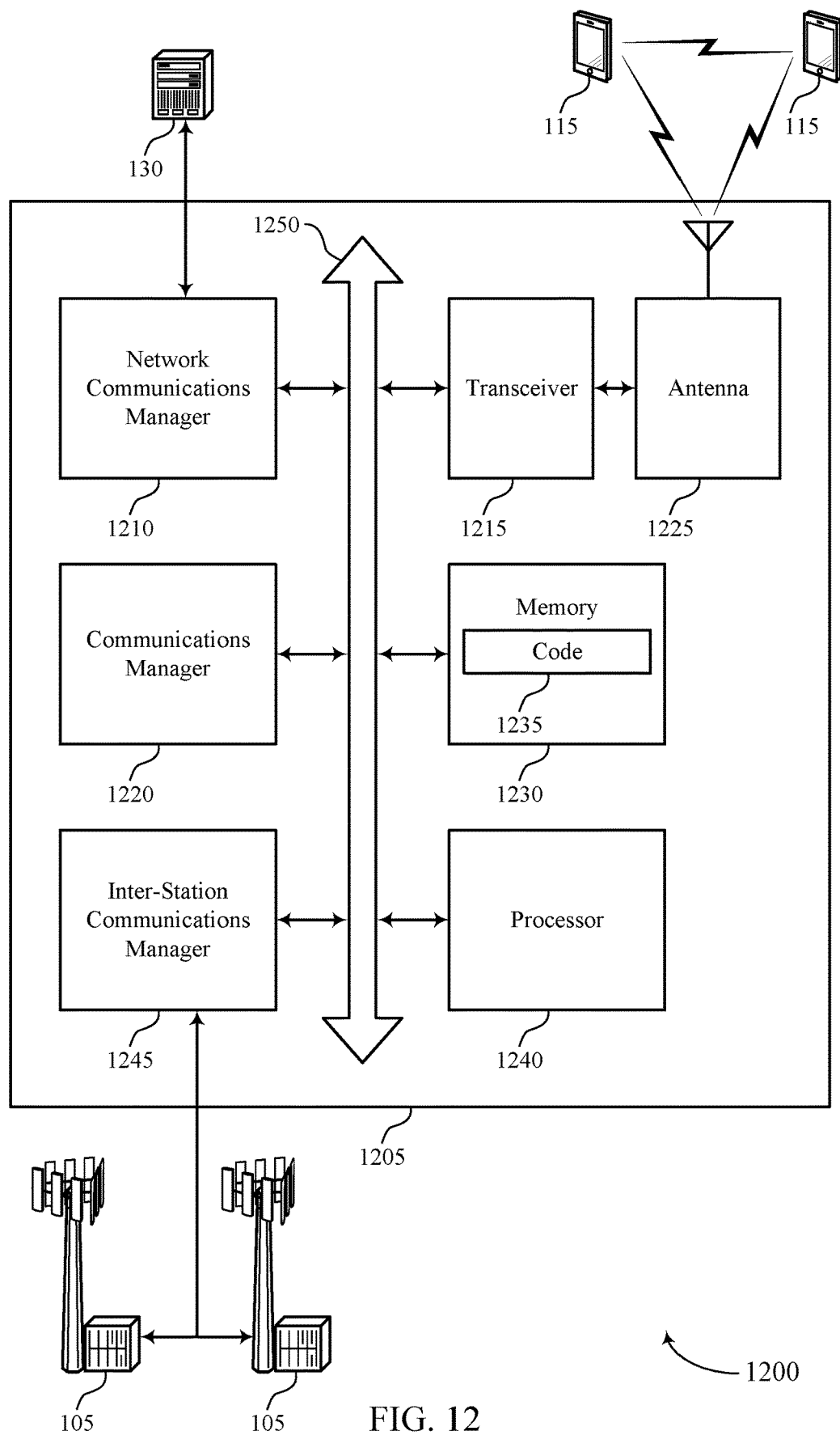
FIG. 12 shows a diagram of a system including a device that supports techniques for multimedia uplink packet handling in accordance with aspects of the present disclosure.

FIG. 12 shows a diagram of a system 1200 including a device 1205 that supports techniques for multimedia uplink packet handling in accordance with aspects of the present disclosure. The device 1205 may be an example of or include the components of a device 905, a device 1005, or a base station 105 (or a network node) as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for multimedia uplink packet handling). For example, the device 1205 or a component of the device 1205 may include a processor 1240 and memory 1230 coupled with or to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a network node in accordance with examples as disclosed herein. For example, the communications manager 1220 may be configured as or otherwise support a means for transmitting signaling indicating an uplink packet handling protocol to apply to a first set of uplink packets including multimedia information, the first set of uplink packets including a first uplink packet and a second uplink packet. The communications manager 1220 may be configured as or otherwise support a means for receiving the second uplink packet including the multimedia information according to the uplink packet handling protocol. The communications manager 1220 may be configured as or otherwise support a means for transmitting a video frame in response to receiving the second uplink packet.

By including or configuring the communications manager 1220 in accordance with examples as described herein, the device 1205 may support techniques for more efficient utilization of communication resources and improved coordination between devices.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for multimedia uplink packet handling as described herein, or the processor 1240 and the memory 1230 may be otherwise configured to perform or support such operations.

Figure 13:
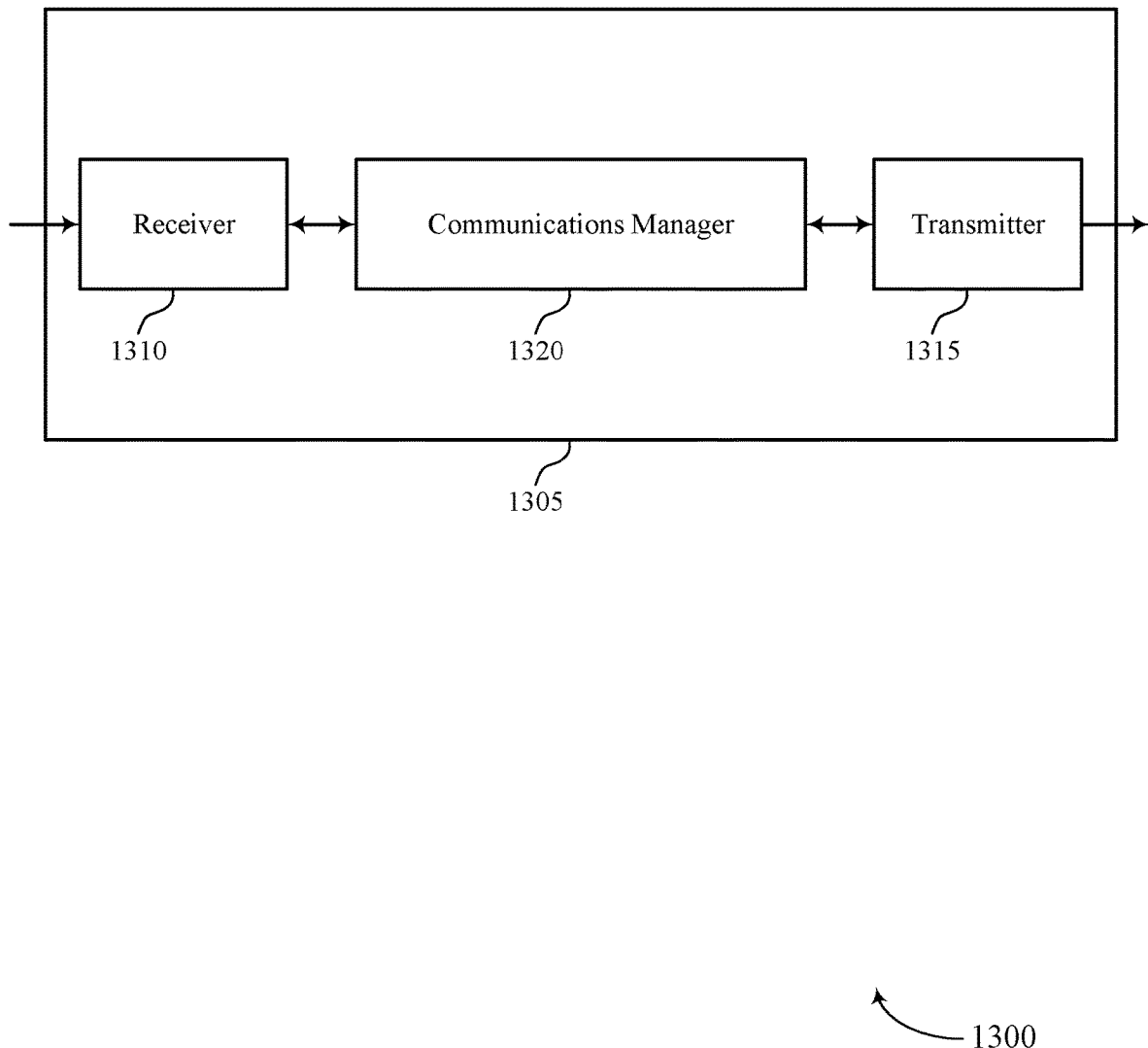
FIGS. 13 and 14 show block diagrams of devices that support techniques for multimedia uplink packet handling in accordance with aspects of the present disclosure.

FIG. 13 shows a block diagram 1300 of a device 1305 that supports techniques for multimedia uplink packet handling in accordance with aspects of the present disclosure. The device 1305 may be an example of aspects of a server 205 as described herein. The device 1305 may include a receiver 1310, a transmitter 1315, and a communications manager 1320. The device 1305 may also include one or more processors, memory coupled with the one or more processors, and instructions stored in the memory that are executable by the one or more processors to enable the one or more processors to perform multimedia uplink packet handling. Each of these components may be in communication with one another (e.g., via one or more buses).

The receiver 1310 may provide a means for receiving information such as packets, user data, control information, or any combination thereof associated with various information channels (e.g., control channels, data channels, information channels related to techniques for multimedia uplink packet handling). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to techniques for multimedia uplink packet handling). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of techniques for multimedia uplink packet handling as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a server in accordance with examples as disclosed herein. For example, the communications manager 1320 may be configured as or otherwise support a means for receiving, from a UE via a network node, a set of multiple uplink packets including multimedia information, the set of multiple uplink packet including a first uplink packet and a second uplink packet. The communications manager 1320 may be configured as or otherwise support a means for estimating future multimedia information associated with the UE based on the first uplink packet and the second uplink packet. The communications manager 1320 may be configured as or otherwise support a means for generating a video frame based on the estimated future multimedia information. The communications manager 1320 may be configured as or otherwise support a means for transmitting, to the UE via the network node, the video frame.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for more efficient utilization of communication resources.

Figure 14:
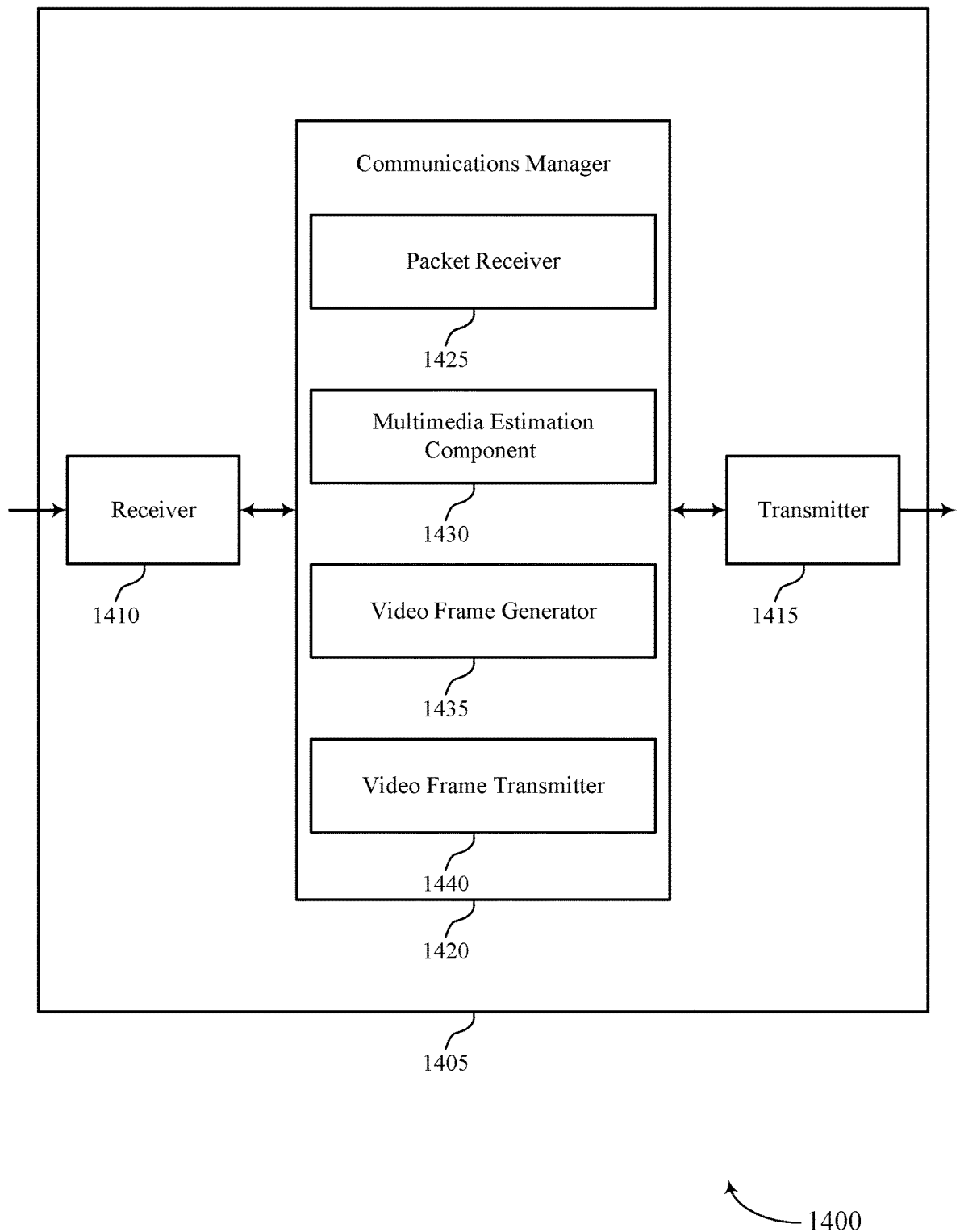

FIG. 14 shows a block diagram 1400 of a device 1405 that supports techniques for multimedia uplink packet handling in accordance with aspects of the present disclosure. The device 1405 may be an example of aspects of a device 1305 or a server 205 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to techniques for multimedia uplink packet handling). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to techniques for multimedia uplink packet handling). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of techniques for multimedia uplink packet handling as described herein. For example, the communications manager 1420 may include a packet receiver 1425, a multimedia estimation component 1430, a video frame generator 1435, a video frame transmitter 1440, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a server in accordance with examples as disclosed herein. The packet receiver 1425 may be configured as or otherwise support a means for receiving, from a UE via a network node, a set of multiple uplink packets including multimedia information, the set of multiple uplink packet including a first uplink packet and a second uplink packet. The multimedia estimation component 1430 may be configured as or otherwise support a means for estimating future multimedia information associated with the UE based on the first uplink packet and the second uplink packet. The video frame generator 1435 may be configured as or otherwise support a means for generating a video frame based on the estimated future multimedia information. The video frame transmitter 1440 may be configured as or otherwise support a means for transmitting, to the UE via the network node, the video frame.

In some cases, the packet receiver 1425, the multimedia estimation component 1430, the video frame generator 1435, and the video frame transmitter 1440 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the packet receiver 1425, the multimedia estimation component 1430, the video frame generator 1435, and the video frame transmitter 1440 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 15:
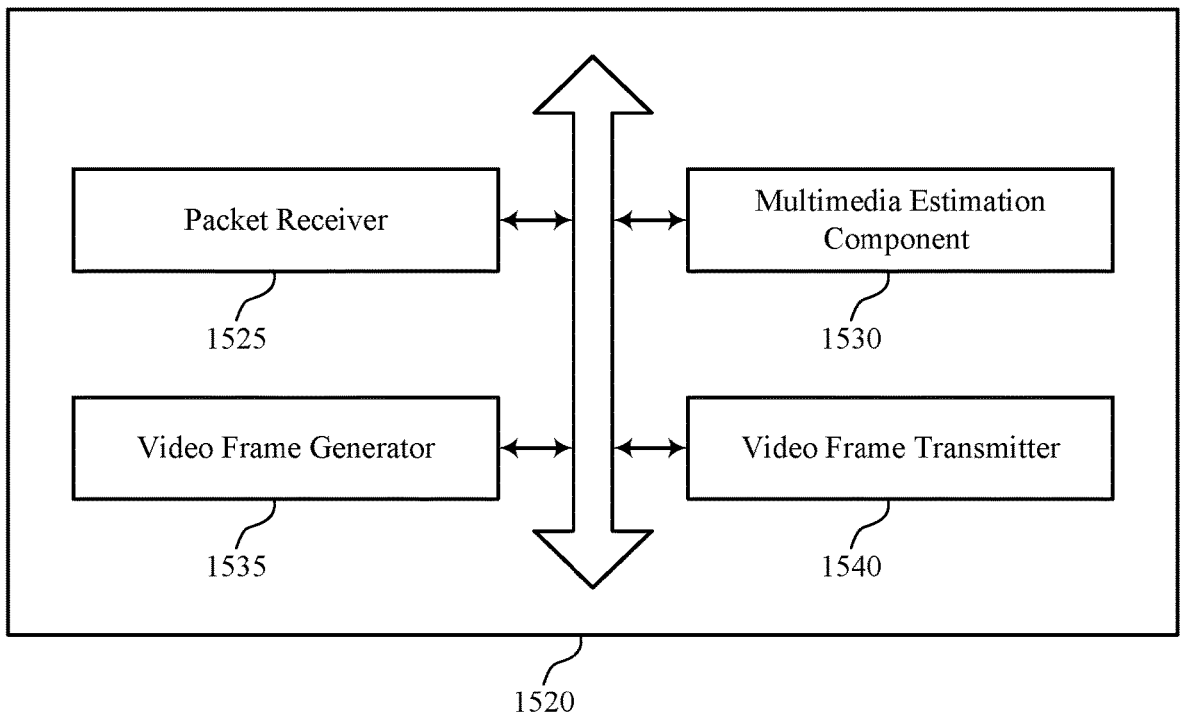
FIG. 15 shows a block diagram of a communications manager that supports techniques for multimedia uplink packet handling in accordance with aspects of the present disclosure.

FIG. 15 shows a block diagram 1500 of a communications manager 1520 that supports techniques for multimedia uplink packet handling in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of techniques for multimedia uplink packet handling as described herein. For example, the communications manager 1520 may include a packet receiver 1525, a multimedia estimation component 1530, a video frame generator 1535, a video frame transmitter 1540, or any combination thereof. Each of these components may communicate, directly or indirectly, with one another (e.g., via one or more buses).

The communications manager 1520 may support wireless communication at a server in accordance with examples as disclosed herein. The packet receiver 1525 may be configured as or otherwise support a means for receiving, from a UE via a network node, a set of multiple uplink packets including multimedia information, the set of multiple uplink packet including a first uplink packet and a second uplink packet. The multimedia estimation component 1530 may be configured as or otherwise support a means for estimating future multimedia information associated with the UE based on the first uplink packet and the second uplink packet. The video frame generator 1535 may be configured as or otherwise support a means for generating a video frame based on the estimated future multimedia information. The video frame transmitter 1540 may be configured as or otherwise support a means for transmitting, to the UE via the network node, the video frame.

In some cases, the packet receiver 1525, the multimedia estimation component 1530, the video frame generator 1535, and the video frame transmitter 1540 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the packet receiver 1525, the multimedia estimation component 1530, the video frame generator 1535, and the video frame transmitter 1540 discussed herein.

Figure 16:
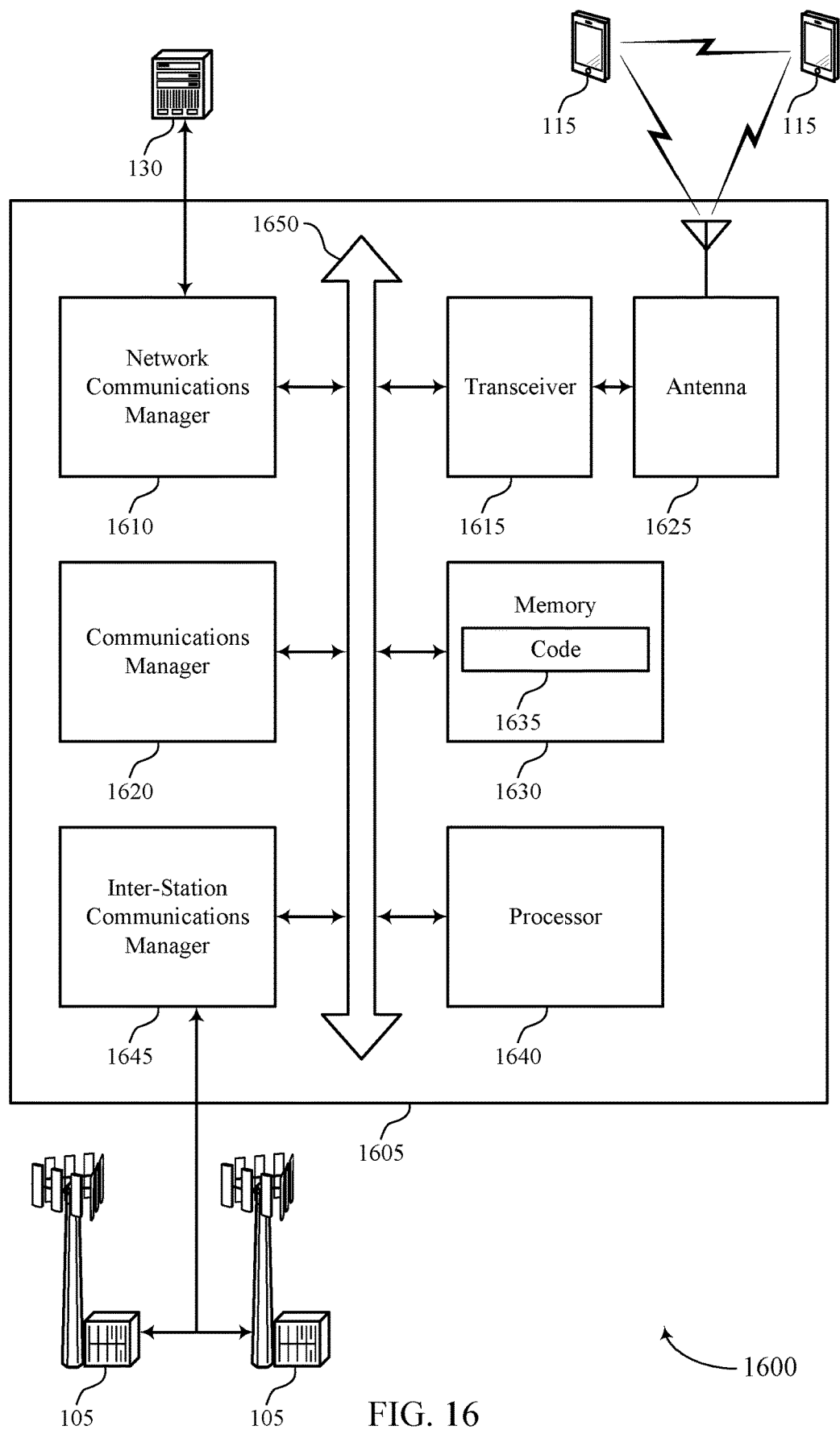
FIG. 16 shows a diagram of a system including a device that supports techniques for multimedia uplink packet handling in accordance with aspects of the present disclosure.

FIG. 16 shows a diagram of a system 1600 including a device 1605 that supports techniques for multimedia uplink packet handling in accordance with aspects of the present disclosure. The device 1605 may be an example of or include the components of a device 1305, a device 1405, or a server as described herein. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting techniques for multimedia uplink packet handling). For example, the device 1605 or a component of the device 1605 may include a processor 1640 and memory 1630 coupled to the processor 1640, the processor 1640 and memory 1630 configured to perform various functions described herein.

The inter-station communications manager 1645 may manage communications with other base stations 105 (or network nodes), and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communication at a server in accordance with examples as disclosed herein. For example, the communications manager 1620 may be configured as or otherwise support a means for receiving, from a UE via a network node, a set of multiple uplink packets including multimedia information, the set of multiple uplink packet including a first uplink packet and a second uplink packet. The communications manager 1620 may be configured as or otherwise support a means for estimating future multimedia information associated with the UE based on the first uplink packet and the second uplink packet. The communications manager 1620 may be configured as or otherwise support a means for generating a video frame based on the estimated future multimedia information. The communications manager 1620 may be configured as or otherwise support a means for transmitting, to the UE via the network node, the video frame.

By including or configuring the communications manager 1620 in accordance with examples as described herein, the device 1605 may support techniques for reduced latency, more efficient utilization of communication resources, and improved coordination.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of techniques for multimedia uplink packet handling as described herein, or the processor 1640 and the memory 1630 may be otherwise configured to perform or support such operations.

Figure 17:
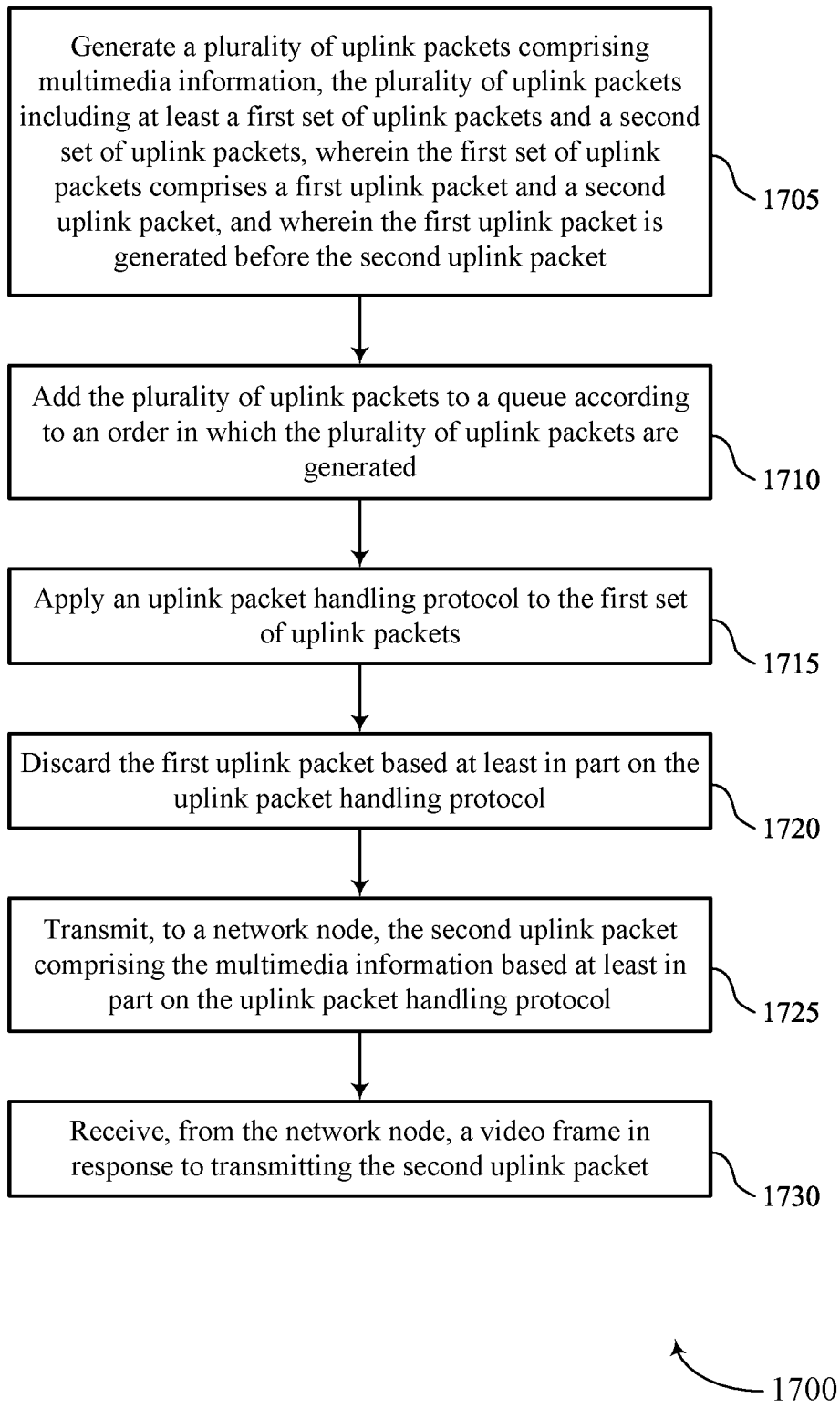
FIGS. 17 through 23 show flowcharts illustrating methods that support techniques for multimedia uplink packet handling in accordance with aspects of the present disclosure.

FIG. 17 shows a flowchart illustrating a method 1700 that supports techniques for multimedia uplink packet handling in accordance with aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1705, the method may include generating a set of multiple uplink packets including multimedia information, the set of multiple uplink packets including at least a first set of uplink packets and a second set of uplink packets, where the first set of uplink packets includes a first uplink packet and a second uplink packet, and where the first uplink packet is generated before the second uplink packet. The operations of 1705 may be performed in accordance with examples as disclosed herein. In some examples, aspects of the operations of 1705 may be performed by a packet generator 725 as described with reference to FIG. 7.

At 1710, the method may include adding the set of multiple uplink packets to a queue according to an order in which the set of multiple uplink packets are generated. The operations of 1710 may be performed in accordance with examples as disclosed herein. In some examples, aspects of the operations of 1710 may be performed by a queue component 730 as described with reference to FIG. 7.

At 1715, the method may include applying an uplink packet handling protocol to the first set of uplink packets. The operations of 1715 may be performed in accordance with examples as disclosed herein. In some examples, aspects of the operations of 1715 may be performed by a UE packet protocol component 735 as described with reference to FIG. 7.

At 1720, the method may include discarding the first uplink packet based on the uplink packet handling protocol. The operations of 1720 may be performed in accordance with examples as disclosed herein. In some examples, aspects of the operations of 1720 may be performed by a discard component 740 as described with reference to FIG. 7.

At 1725, the method may include transmitting, to a network node, the second uplink packet including the multimedia information based on the uplink packet handling protocol. The operations of 1725 may be performed in accordance with examples as disclosed herein. In some examples, aspects of the operations of 1725 may be performed by a packet transmitter 745 as described with reference to FIG. 7.

At 1730, the method may include receiving, from the network node, a video frame in response to transmitting the second uplink packet. The operations of 1730 may be performed in accordance with examples as disclosed herein. In some examples, aspects of the operations of 1730 may be performed by a video frame receiver 750 as described with reference to FIG. 7.

Figure 18:
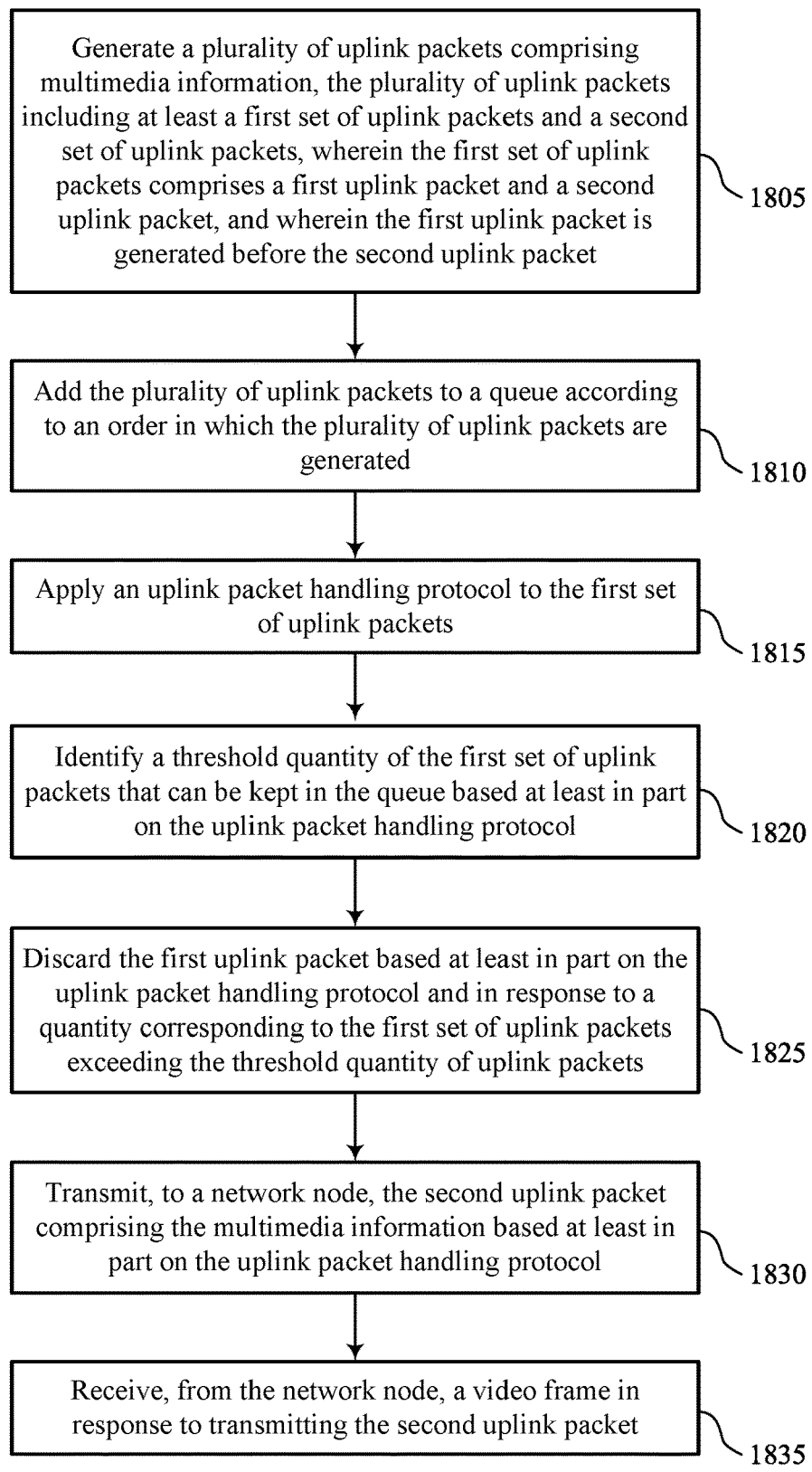

FIG. 18 shows a flowchart illustrating a method 1800 that supports techniques for multimedia uplink packet handling in accordance with aspects of the present disclosure. The operations of the method 1800 may be implemented by a UE or its components as described herein. For example, the operations of the method 1800 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1805, the method may include generating a set of multiple uplink packets including multimedia information, the set of multiple uplink packets including at least a first set of uplink packets and a second set of uplink packets, where the first set of uplink packets includes a first uplink packet and a second uplink packet, and where the first uplink packet is generated before the second uplink packet. The operations of 1805 may be performed in accordance with examples as disclosed herein. In some examples, aspects of the operations of 1805 may be performed by a packet generator 725 as described with reference to FIG. 7.

At 1810, the method may include adding the set of multiple uplink packets to a queue according to an order in which the set of multiple uplink packets are generated. The operations of 1810 may be performed in accordance with examples as disclosed herein. In some examples, aspects of the operations of 1810 may be performed by a queue component 730 as described with reference to FIG. 7.

At 1815, the method may include applying an uplink packet handling protocol to the first set of uplink packets. The operations of 1815 may be performed in accordance with examples as disclosed herein. In some examples, aspects of the operations of 1815 may be performed by a UE packet protocol component 735 as described with reference to FIG. 7.

At 1820, the method may include identifying a threshold quantity of the first set of uplink packets that can be kept in the queue based on the uplink packet handling protocol. The operations of 1820 may be performed in accordance with examples as disclosed herein. In some examples, aspects of the operations of 1820 may be performed by a UE threshold component 755 as described with reference to FIG. 7.

At 1825, the method may include discarding the first uplink packet based on the uplink packet handling protocol and in response to a quantity corresponding to the first set of uplink packets exceeding the threshold quantity of uplink packets. The operations of 1825 may be performed in accordance with examples as disclosed herein. In some examples, aspects of the operations of 1825 may be performed by a discard component 740 as described with reference to FIG. 7.

At 1830, the method may include transmitting, to a network node, the second uplink packet including the multimedia information based on the uplink packet handling protocol. The operations of 1830 may be performed in accordance with examples as disclosed herein. In some examples, aspects of the operations of 1830 may be performed by a packet transmitter 745 as described with reference to FIG. 7.

At 1835, the method may include receiving, from the network node, a video frame in response to transmitting the second uplink packet. The operations of 1835 may be performed in accordance with examples as disclosed herein. In some examples, aspects of the operations of 1835 may be performed by a video frame receiver 750 as described with reference to FIG. 7.

Figure 19:
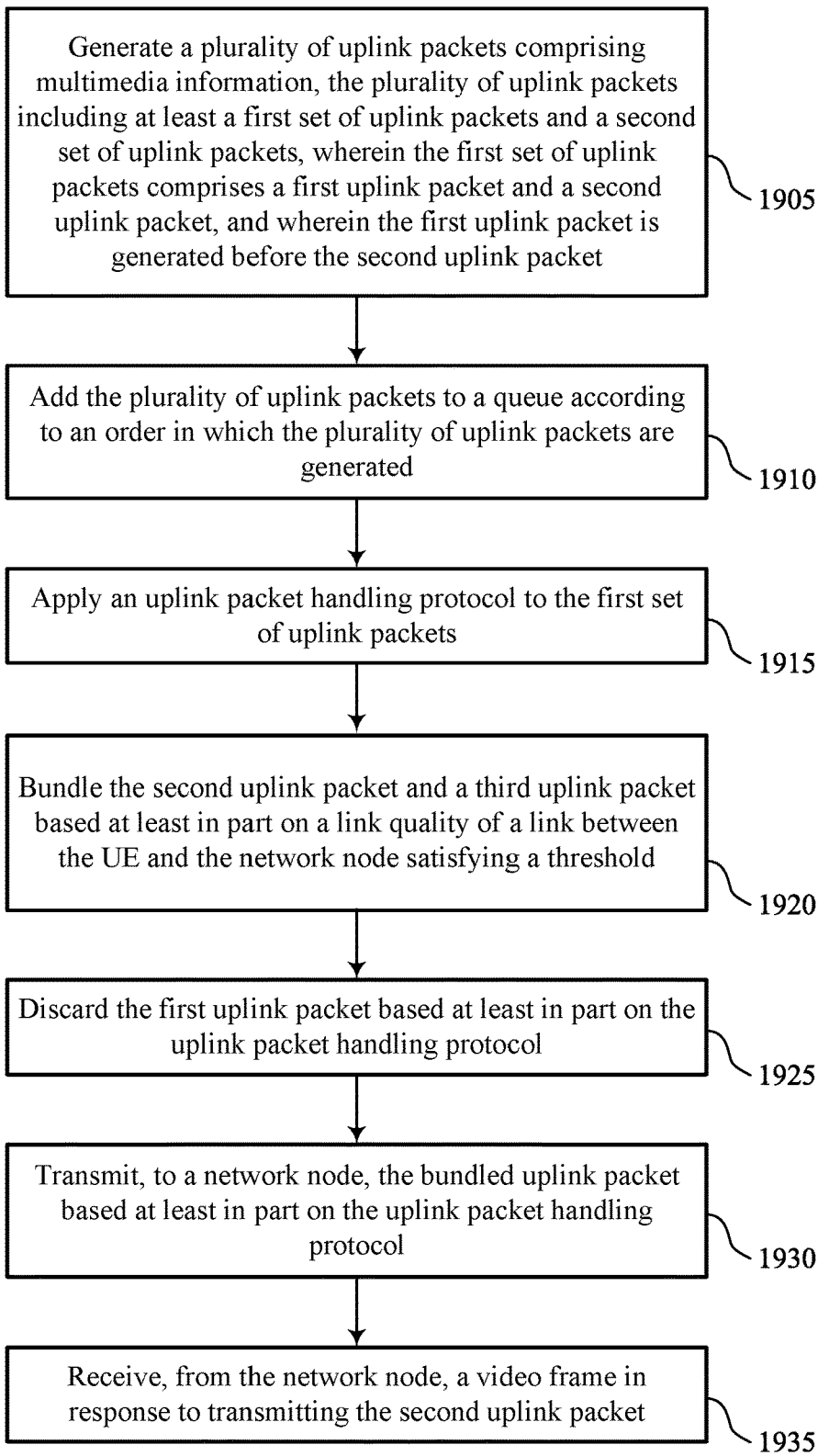

FIG. 19 shows a flowchart illustrating a method 1900 that supports techniques for multimedia uplink packet handling in accordance with aspects of the present disclosure. The operations of the method 1900 may be implemented by a UE or its components as described herein. For example, the operations of the method 1900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1905, the method may include generating a set of multiple uplink packets including multimedia information, the set of multiple uplink packets including at least a first set of uplink packets and a second set of uplink packets, where the first set of uplink packets includes a first uplink packet and a second uplink packet, and where the first uplink packet is generated before the second uplink packet. The operations of 1905 may be performed in accordance with examples as disclosed herein. In some examples, aspects of the operations of 1905 may be performed by a packet generator 725 as described with reference to FIG. 7.

At 1910, the method may include adding the set of multiple uplink packets to a queue according to an order in which the set of multiple uplink packets are generated. The operations of 1910 may be performed in accordance with examples as disclosed herein. In some examples, aspects of the operations of 1910 may be performed by a queue component 730 as described with reference to FIG. 7.

At 1915, the method may include applying an uplink packet handling protocol to the first set of uplink packets. The operations of 1915 may be performed in accordance with examples as disclosed herein. In some examples, aspects of the operations of 1915 may be performed by a UE packet protocol component 735 as described with reference to FIG. 7.

At 1920, the method may include bundling the second uplink packet and the third uplink packet based on a link quality of a link between the UE and the network node satisfying a threshold. The operations of 1920 may be performed in accordance with examples as disclosed herein. In some examples, aspects of the operations of 1920 may be performed by a UE bundling component 765 as described with reference to FIG. 7.

At 1925, the method may include discarding the first uplink packet based on the uplink packet handling protocol. The operations of 1925 may be performed in accordance with examples as disclosed herein. In some examples, aspects of the operations of 1925 may be performed by a discard component 740 as described with reference to FIG. 7.

At 1930, the method may include transmitting, to a network node, the bundled uplink packet based on the uplink packet handling protocol. The operations of 1930 may be performed in accordance with examples as disclosed herein. In some examples, aspects of the operations of 1930 may be performed by a packet transmitter 745 as described with reference to FIG. 7.

At 1935, the method may include receiving, from the network node, a video frame in response to transmitting the second uplink packet. The operations of 1935 may be performed in accordance with examples as disclosed herein. In some examples, aspects of the operations of 1935 may be performed by a video frame receiver 750 as described with reference to FIG. 7.

Figure 20:
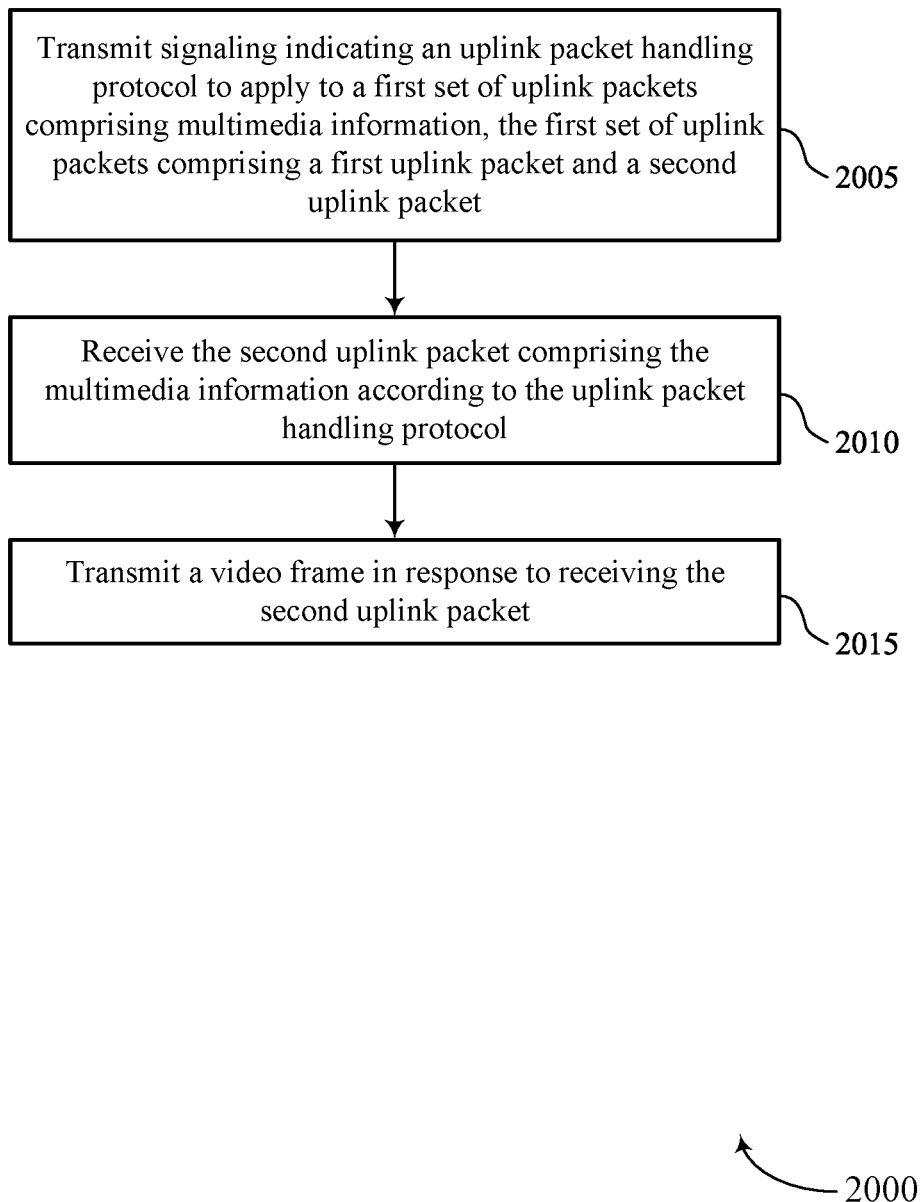

FIG. 20 shows a flowchart illustrating a method 2000 that supports techniques for multimedia uplink packet handling in accordance with aspects of the present disclosure. The operations of the method 2000 may be implemented by a base station (or a network node) or its components as described herein. For example, the operations of the method 2000 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 2005, the method may include transmitting signaling indicating an uplink packet handling protocol to apply to a first set of uplink packets including multimedia information, the first set of uplink packets including a first uplink packet and a second uplink packet. The operations of 2005 may be performed in accordance with examples as disclosed herein. In some examples, aspects of the operations of 2005 may be performed by a packet protocol component 1125 as described with reference to FIG. 11.

At 2010, the method may include receiving the second uplink packet including the multimedia information according to the uplink packet handling protocol. The operations of 2010 may be performed in accordance with examples as disclosed herein. In some examples, aspects of the operations of 2010 may be performed by a packet receiver 1130 as described with reference to FIG. 11.

At 2015, the method may include transmitting a video frame in response to receiving the second uplink packet. The operations of 2015 may be performed in accordance with examples as disclosed herein. In some examples, aspects of the operations of 2015 may be performed by a video frame relay component 1135 as described with reference to FIG. 11.

Figure 21:
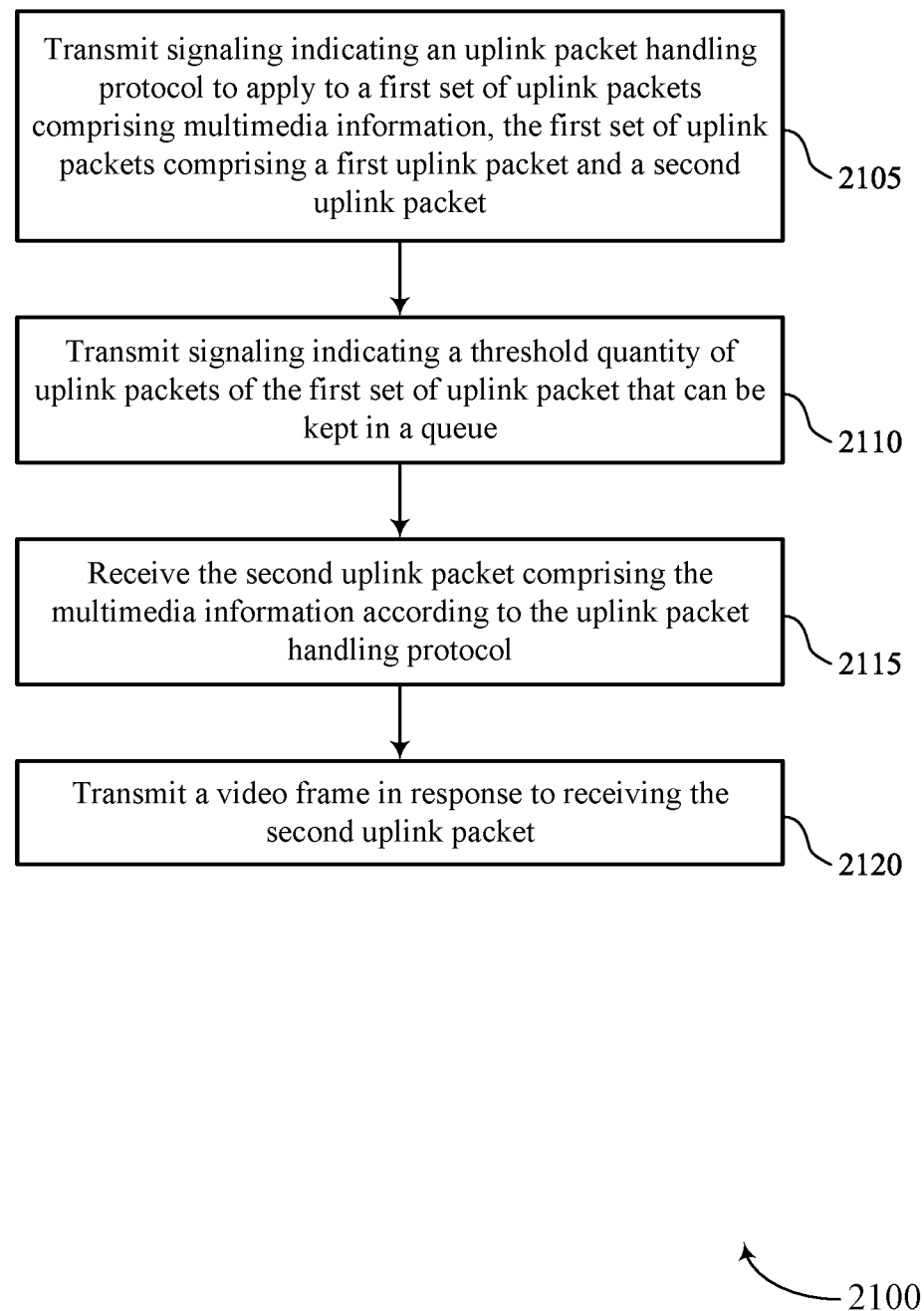

FIG. 21 shows a flowchart illustrating a method 2100 that supports techniques for multimedia uplink packet handling in accordance with aspects of the present disclosure. The operations of the method 2100 may be implemented by a base station (or a network node) or its components as described herein. For example, the operations of the method 2100 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 2105, the method may include transmitting signaling indicating an uplink packet handling protocol to apply to a first set of uplink packets including multimedia information, the first set of uplink packets including a first uplink packet and a second uplink packet. The operations of 2105 may be performed in accordance with examples as disclosed herein. In some examples, aspects of the operations of 2105 may be performed by a packet protocol component 1125 as described with reference to FIG. 11.

At 2110, the method may include transmitting signaling indicating a threshold quantity of uplink packets of the first set of uplink packet that can be kept in a queue. The operations of 2110 may be performed in accordance with examples as disclosed herein. In some examples, aspects of the operations of 2110 may be performed by a threshold component 1140 as described with reference to FIG. 11.

At 2115, the method may include receiving the second uplink packet including the multimedia information according to the uplink packet handling protocol. The operations of 2115 may be performed in accordance with examples as disclosed herein. In some examples, aspects of the operations of 2115 may be performed by a packet receiver 1130 as described with reference to FIG. 11.

At 2120, the method may include transmitting a video frame in response to receiving the second uplink packet. The operations of 2120 may be performed in accordance with examples as disclosed herein. In some examples, aspects of the operations of 2120 may be performed by a video frame relay component 1135 as described with reference to FIG. 11.

Figure 22:
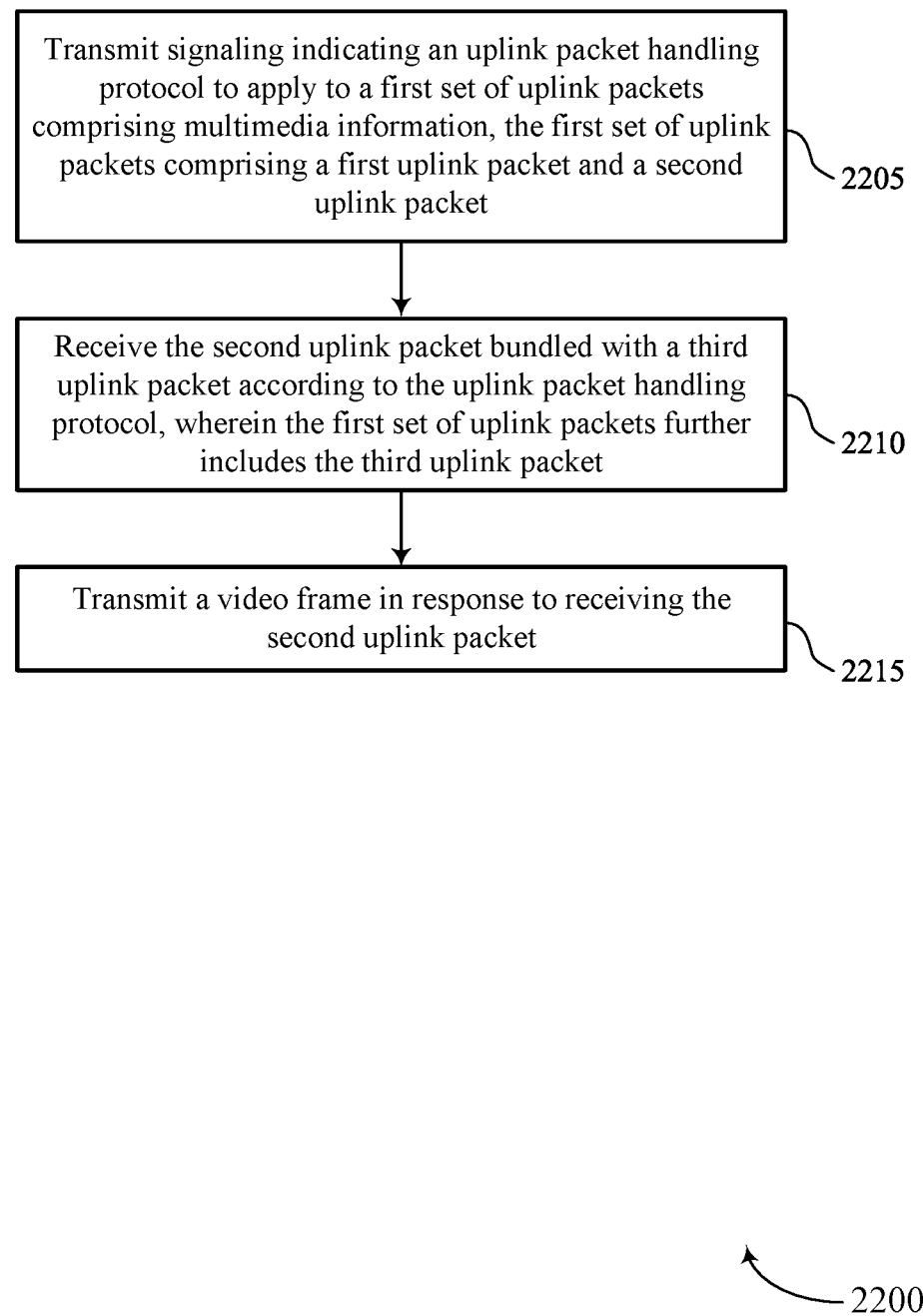

FIG. 22 shows a flowchart illustrating a method 2200 that supports techniques for multimedia uplink packet handling in accordance with aspects of the present disclosure. The operations of the method 2200 may be implemented by a base station (or a network node) or its components as described herein. For example, the operations of the method 2200 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 2205, the method may include transmitting signaling indicating an uplink packet handling protocol to apply to a first set of uplink packets including multimedia information, the first set of uplink packets including a first uplink packet and a second uplink packet. The operations of 2205 may be performed in accordance with examples as disclosed herein. In some examples, aspects of the operations of 2205 may be performed by a packet protocol component 1125 as described with reference to FIG. 11.

At 2210, the method may include receiving the second uplink packet bundled with a third uplink packet, where the first set of uplink packets further includes the third uplink packet. The operations of 2210 may be performed in accordance with examples as disclosed herein. In some examples, aspects of the operations of 2210 may be performed by a bundling component 1145 as described with reference to FIG. 11.

At 2215, the method may include transmitting a video frame in response to receiving the second uplink packet. The operations of 2215 may be performed in accordance with examples as disclosed herein. In some examples, aspects of the operations of 2215 may be performed by a video frame relay component 1135 as described with reference to FIG. 11.

Figure 23:
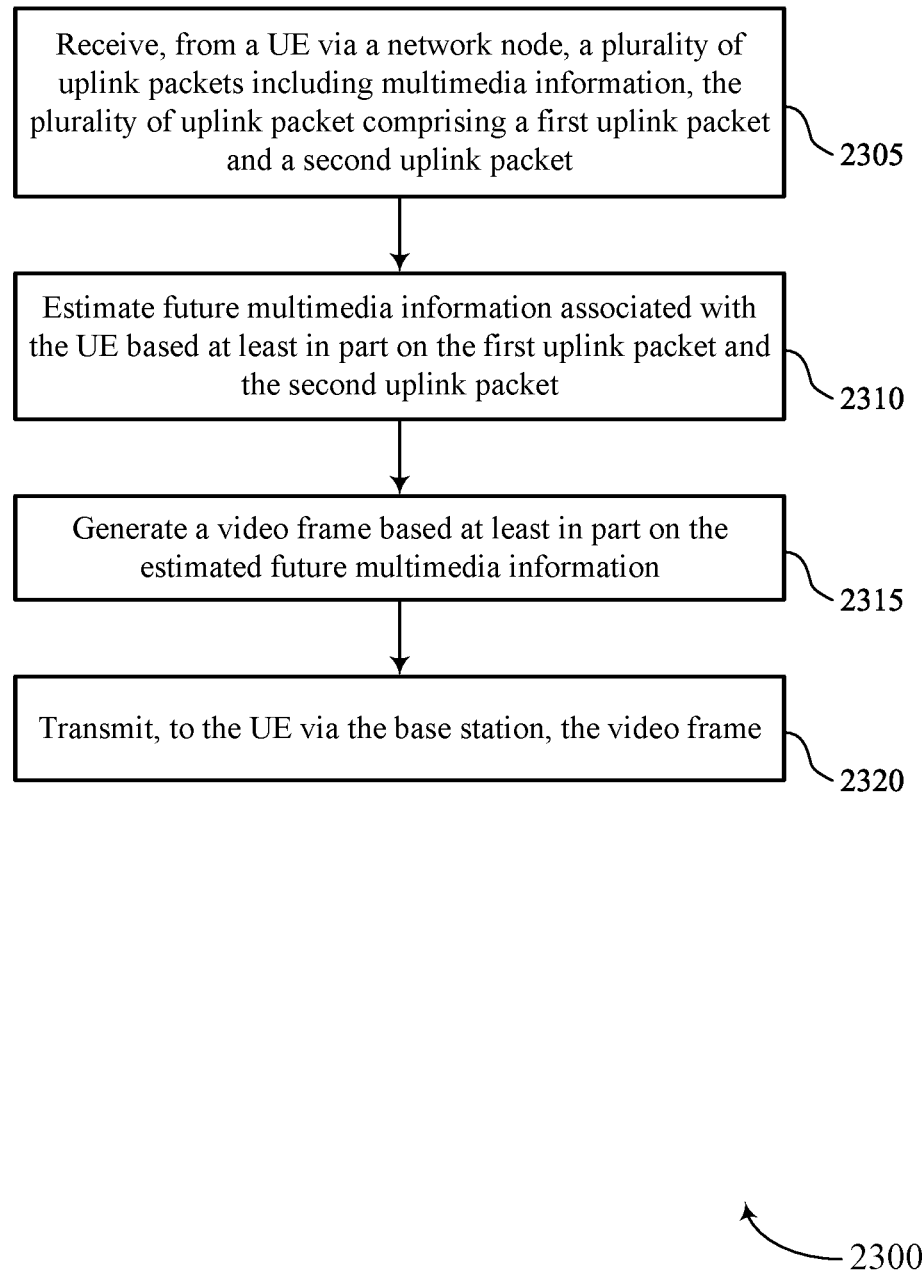

FIG. 23 shows a flowchart illustrating a method 2300 that supports techniques for multimedia uplink packet handling in accordance with aspects of the present disclosure. The operations of the method 2300 may be implemented by a server or its components as described herein. For example, the operations of the method 2300 may be performed by a server as described with reference to FIGS. 1 through 4 and 13 through 16. In some examples, a server may execute a set of instructions to control the functional elements of the server to perform the described functions. Additionally or alternatively, the server may perform aspects of the described functions using special-purpose hardware.

At 2305, the method may include receiving, from a UE via a network node, a set of multiple uplink packets including multimedia information, the set of multiple uplink packet including a first uplink packet and a second uplink packet. The operations of 2305 may be performed in accordance with examples as disclosed herein. In some examples, aspects of the operations of 2305 may be performed by a packet receiver 1525 as described with reference to FIG. 15.

At 2310, the method may include estimating future multimedia information associated with the UE based on the first uplink packet and the second uplink packet. The operations of 2310 may be performed in accordance with examples as disclosed herein. In some examples, aspects of the operations of 2310 may be performed by a multimedia estimation component 1530 as described with reference to FIG. 15.

At 2315, the method may include generating a video frame based on the estimated future multimedia information. The operations of 2315 may be performed in accordance with examples as disclosed herein. In some examples, aspects of the operations of 2315 may be performed by a video frame generator 1535 as described with reference to FIG. 15.

At 2320, the method may include transmitting, to the UE via the network node, the video frame. The operations of 2320 may be performed in accordance with examples as disclosed herein. In some examples, aspects of the operations of 2320 may be performed by a video frame transmitter 1540 as described with reference to FIG. 15.

The following provides an overview of aspects of the present disclosure:

Aspect 1: A method for wireless communication at a UE, comprising: generating a plurality of uplink packets comprising multimedia information, the plurality of uplink packets including at least a first set of uplink packets and a second set of uplink packets, wherein the first set of uplink packets comprises a first uplink packet and a second uplink packet, and wherein the first uplink packet is generated before the second uplink packet; adding the plurality of uplink packets to a queue according to an order in which the plurality of uplink packets are generated; applying an uplink packet handling protocol to the first set of uplink packets; discarding the first uplink packet based at least in part on the uplink packet handling protocol; transmitting, to a network node, the second uplink packet comprising the multimedia information based at least in part on the uplink packet handling protocol; and receiving, from the network node, a video frame in response to transmitting the second uplink packet.

Aspect 2: The method of aspect 1, wherein the UE operates in accordance to a communication model, the communication model comprising at least an application layer and a physical layer, the method further comprising: transmitting signaling indicating the uplink packet handling protocol from the application to the physical layer.

Aspect 3: The method of aspect 1, further comprising: receiving, from the network node, signaling indicating the uplink packet handling protocol.

Aspect 4: The method of any of aspects 1 through 3, wherein the first set of uplink packet includes uplink packets that correspond to one or more of a same source IP address, destination IP address, UDP port, or DSCP marking.

Aspect 5: The method of any of aspects 1 through 4, wherein the second uplink packet is a last uplink packet added to the queue.

Aspect 6: The method of any of aspects 1 through 5, further comprising: identifying a threshold quantity of the first set of uplink packets that can be kept in the queue based at least in part on the uplink packet handling protocol, wherein discarding the first uplink packet is in response to a quantity corresponding to the first set of uplink packets exceeding the threshold quantity of uplink packets.

Aspect 7: The method of aspect 6, wherein the threshold quantity of the first set of uplink packets is based at least in part on a rate of change of the multimedia information.

Aspect 8: The method of any of aspects 1 through 7, wherein the first set of uplink packets further comprises a third uplink packet, the third uplink packet generated after the second uplink packet.

Aspect 9: The method of aspect 8, further comprising: bundling the second uplink packet and the third uplink packet based at least in part on a link quality of a link between the UE and the network node satisfying a threshold, wherein transmitting the second uplink packet comprises transmitting the bundled uplink packet to the network node.

Aspect 10: The method of aspect 9, wherein the second uplink packet and the third uplink packet are the last two uplink packets of the first set of uplink packets to be added to the queue.

Aspect 11: The method of any of aspects 1 through 10, further comprising: powering off one or more transceiver components at the UE for a duration, the duration comprising a time between transmitting the second uplink packet and receiving the video frame or a time between receiving a second video frame and transmitting the second uplink packet, wherein the second video frame is received before the video frame.

Aspect 12: The method of any of aspects 1 through 11, wherein the multimedia information comprises a location of the UE, an orientation of the UE, a set of user inputs, or a combination thereof.

Aspect 13: A method for wireless communications at a network node, comprising: transmitting signaling indicating an uplink packet handling protocol to apply to a first set of uplink packets comprising multimedia information, the first set of uplink packets comprising a first uplink packet and a second uplink packet; receiving the second uplink packet comprising the multimedia information according to the uplink packet handling protocol; transmitting a video frame in response to receiving the second uplink packet.

Aspect 14: The method of aspect 13, wherein the first set of uplink packets includes uplink packets that correspond to one or more of a same source IP address, destination IP address, UDP port, or DSCP marking.

Aspect 15: The method of any of aspects 13 through 14, further comprising: transmitting signaling indicating a threshold quantity of uplink packets of the first set of uplink packet that can be kept in a queue.

Aspect 16: The method of aspect 15, wherein the threshold quantity of uplink packets is based at least in part on a rate of change of the multimedia information.

Aspect 17: The method of any of aspects 13 through 16, wherein receiving the second uplink packet comprises: receiving the second uplink packet bundled with a third uplink packet, wherein the first set of uplink packets further includes the third uplink packet.

Aspect 18: The method of any of aspects 13 through 17, wherein the multimedia information comprises a location of the UE, an orientation of the UE, a set of user inputs, or a combination thereof.

Aspect 19: A method for wireless communication at a server, the method comprising: receiving, from a UE via a network node, a plurality of uplink packets including multimedia information, the plurality of uplink packet comprising a first uplink packet and a second uplink packet; estimating future multimedia information associated with the UE based at least in part on the first uplink packet and the second uplink packet; generating a video frame based at least in part on the estimated future multimedia information; and transmitting, to the UE via the network node, the video frame.

Aspect 20: An apparatus for wireless communication at a UE, comprising a processor; memory coupled with the processor; and instructions stored in the memory and executable by the processor to cause the apparatus to perform a method of any of aspects 1 through 12.

Aspect 21: An apparatus for wireless communication at a UE, comprising at least one means for performing a method of any of aspects 1 through 12.

Aspect 22: A non-transitory computer-readable medium storing code for wireless communication at a UE, the code comprising instructions executable by a processor to perform a method of any of aspects 1 through 12.

Aspect 23: An apparatus for wireless communications at a network node, comprising a processor; memory coupled with the processor; and instructions stored in the memory and executable by the processor to cause the apparatus to perform a method of any of aspects 13 through 18.

Aspect 24: An apparatus for wireless communications at a network node, comprising at least one means for performing a method of any of aspects 13 through 18.

Aspect 25: A non-transitory computer-readable medium storing code for wireless communications at a network node, the code comprising instructions executable by a processor to perform a method of any of aspects 13 through 18.

Aspect 26: An apparatus for wireless communication at a server, comprising a processor; memory coupled with the processor; and instructions stored in the memory and executable by the processor to cause the apparatus to perform a method of any of aspects 19 through 19.

Aspect 27: An apparatus for wireless communication at a server, comprising at least one means for performing a method of any of aspects 19 through 19.

Aspect 28: A non-transitory computer-readable medium storing code for wireless communication at a server, the code comprising instructions executable by a processor to perform a method of any of aspects 19 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
   memory; and
   one or more processors coupled with the memory and configured to cause the UE to:
   receive, from a network node, signaling indicating an uplink packet handling protocol to apply to a first set of uplink packets;
   generate a plurality of uplink packets comprising multimedia information, the plurality of uplink packets including at least the first set of uplink packets and a second set of uplink packets, wherein the first set of uplink packets comprises a first uplink packet, a second uplink packet, and a third uplink packet, and wherein the first uplink packet is generated before the second uplink packet and the third uplink packet;
   add the plurality of uplink packets to a queue according to an order in which the plurality of uplink packets are generated;
   apply the uplink packet handling protocol to the first set of uplink packets;

discard the first uplink packet based at least in part on the uplink packet handling protocol;
bundle the second uplink packet and the third uplink packet based at least in part on the uplink packet handling protocol;
transmit, to the network node, the bundled uplink packet based at least in part on the uplink packet handling protocol; and
receive, from the network node, a video frame in response to transmitting the bundled uplink packet.

2. The UE of claim 1, wherein the first set of uplink packets includes uplink packets that correspond to one or more of a same source internet protocol address, destination internet protocol address, user datagram protocol port, or differentiated services code point marking.

3. The UE of claim 1, wherein the second uplink packet is a last uplink packet added to the queue.

4. The UE of claim 1, wherein the one or more processors are further configured to cause the UE to:
identify a threshold quantity of the first set of uplink packets that can be kept in the queue based at least in part on the uplink packet handling protocol, wherein discarding the first uplink packet is in response to a quantity corresponding to the first set of uplink packets exceeding the threshold quantity of uplink packets.

5. The UE of claim 4, wherein the threshold quantity of the first set of uplink packets is based at least in part on a rate of change of the multimedia information.

6. The UE of claim 1, wherein the third uplink packet is generated after the second uplink packet.

7. The UE of claim 1, wherein, to bundle the second uplink packet and the third uplink packet, the one or more processors are configured to cause the UE to:
bundle the second uplink packet and the third uplink packet based at least in part on a link quality of a link between the UE and the network node satisfying a threshold.

8. The UE of claim 1, wherein the second uplink packet and the third uplink packet are the last two uplink packets of the first set of uplink packets to be added to the queue.

9. The UE of claim 1, wherein the one or more processors are further configured to cause the UE to:
power off one or more transceiver components at the UE for a duration, the duration comprising a time between transmitting the second uplink packet and receiving the video frame or a time between receiving a second video frame and transmitting the second uplink packet, wherein the second video frame is received before the video frame.

10. The UE of claim 1, wherein the multimedia information comprises a location of the UE, an orientation of the UE, a set of user inputs, or a combination thereof.

11. A network node for wireless communications, comprising:
memory; and
one or more processors coupled with the memory and configured to cause the network node to:
transmit signaling indicating an uplink packet handling protocol to apply to a first set of uplink packets comprising multimedia information, the first set of uplink packets comprising a first uplink packet, a second uplink packet, and a third uplink packet;
receive the second uplink packet bundled with the third uplink packet according to the uplink packet handling protocol; and
transmit, to a user equipment (UE), a video frame in response to receiving the bundled uplink packet.

12. The network node of claim 11, wherein the first set of uplink packets includes uplink packets that correspond to one or more of a same source internet protocol address, destination internet protocol address, user datagram protocol port, or differential services code point marking.

13. The network node of claim 11, wherein the one or more processors are further configured to cause the network node to:
transmit signaling indicating a threshold quantity of uplink packets of the first set of uplink packets that can be kept in a queue.

14. The network node of claim 13, wherein the threshold quantity of uplink packets is based at least in part on a rate of change of the multimedia information.

15. The network node of claim 11, wherein the multimedia information comprises a location of the UE, an orientation of the UE, a set of user inputs, or a combination thereof.

16. A method for wireless communication at a user equipment (UE), comprising:
receiving, from a network node, signaling indicating an uplink packet handling protocol to apply to a first set of uplink packets;
generating a plurality of uplink packets comprising multimedia information, the plurality of uplink packets including at least the first set of uplink packets and a second set of uplink packets, wherein the first set of uplink packets comprises a first uplink packet, a second uplink packet, and a third uplink packet, and wherein the first uplink packet is generated before the second uplink packet and the third uplink packet;
adding the plurality of uplink packets to a queue according to an order in which the plurality of uplink packets are generated;
applying the uplink packet handling protocol to the first set of uplink packets;
discarding the first uplink packet based at least in part on the uplink packet handling protocol;
bundling the second uplink packet and the third uplink packet based at least in part on the uplink packet handling protocol;
transmitting, to the network node, the bundled uplink packet based at least in part on the uplink packet handling protocol; and
receiving, from the network node, a video frame in response to transmitting the bundled uplink packet.

17. The method of claim 16, wherein the first set of uplink packets includes uplink packets that correspond to one or more of a same source internet protocol address, destination internet protocol address, user datagram protocol port, or differentiated services code point marking.

18. The method of claim 16, wherein the second uplink packet is a last uplink packet added to the queue.

19. The method of claim 16, further comprising:
identifying a threshold quantity of the first set of uplink packets that can be kept in the queue based at least in part on the uplink packet handling protocol, wherein discarding the first uplink packet is in response to a quantity corresponding to the first set of uplink packets exceeding the threshold quantity of uplink packets.

20. The method of claim 19, wherein the threshold quantity of the first set of uplink packets is based at least in part on a rate of change of the multimedia information.

21. The method of claim 16, wherein the third uplink packet generated after the second uplink packet.

22. The method of claim 16, wherein bundling the second uplink packet and the third uplink packet comprises:

bundling the second uplink packet and the third uplink packet based at least in part on a link quality of a link between the UE and the network node satisfying a threshold.

23. The method of claim 16, wherein the second uplink packet and the third uplink packet are the last two uplink packets of the first set of uplink packets to be added to the queue.

24. The method of claim 16, further comprising:
powering off one or more transceiver components at the UE for a duration, the duration comprising a time between transmitting the second uplink packet and receiving the video frame or a time between receiving a second video frame and transmitting the second uplink packet, wherein the second video frame is received before the video frame.

25. The method of claim 16, wherein the multimedia information comprises a location of the UE, an orientation of the UE, a set of user inputs, or a combination thereof.

26. A method for wireless communication at a network node, comprising:
transmitting signaling indicating an uplink packet handling protocol to apply to a first set of uplink packets comprising multimedia information, the first set of uplink packets comprising a first uplink packet, a second uplink packet, and a third uplink packet;
receiving the second uplink packet bundled with the third uplink packet according to the uplink packet handling protocol; and
transmitting, to a user equipment (UE), a video frame in response to receiving the bundled uplink packet.

27. The method of claim 26, wherein the first set of uplink packets includes uplink packets that correspond to one or more of a same source internet protocol address, destination internet protocol address, user datagram protocol port, or differential services code point marking.

28. The method of claim 26, further comprising:
transmitting signaling indicating a threshold quantity of uplink packets of the first set of uplink packets that can be kept in a queue.

29. The method of claim 28, wherein the threshold quantity of uplink packets is based at least in part on a rate of change of the multimedia information.

30. The method of claim 26, wherein the multimedia information comprises a location of the UE, an orientation of the UE, a set of user inputs, or a combination thereof.

* * * * *